(12) United States Patent
Miller et al.

(10) Patent No.: US 7,980,636 B2
(45) Date of Patent: Jul. 19, 2011

(54) AUTOMATED GATE CONTROL AND METHODS

(75) Inventors: Douglas C. Miller, Sisters, OR (US); Joshua D. Miller, Springfield, OR (US)

(73) Assignee: MIP Holdings, LLC, Reno, NV (US)

( * ) Notice: Subject to any disclaimer, the term of this patent is extended or adjusted under 35 U.S.C. 154(b) by 708 days.

(21) Appl. No.: 11/655,736

(22) Filed: Jan. 19, 2007

(65) Prior Publication Data

US 2007/0188010 A1   Aug. 16, 2007

Related U.S. Application Data

(60) Provisional application No. 60/760,611, filed on Jan. 20, 2006.

(51) Int. Cl.
*B60P 1/56* (2006.01)
(52) U.S. Cl. .......................................................... 298/29
(58) Field of Classification Search .................... 298/29, 298/27, 1 B; 222/23, 251, 283; 49/340; 414/414
See application file for complete search history.

(56) References Cited

U.S. PATENT DOCUMENTS

| | | | | |
|---|---|---|---|---|
| 2,630,929 A | * | 3/1953 | Pearson | 414/469 |
| 2,663,231 A | * | 12/1953 | Wood | 404/110 |
| 2,720,417 A | * | 10/1955 | Kling | 298/18 |
| 2,989,930 A | | 6/1961 | Flowers | |
| 2,991,730 A | | 7/1961 | Arbel | |
| 3,034,831 A | * | 5/1962 | Biszantz et al. | 298/22 D |
| 3,173,381 A | | 3/1965 | Charles et al. | |
| 3,186,015 A | * | 6/1965 | Beyerstedt | 15/84 |
| 3,298,745 A | * | 1/1967 | Czapiewski | 298/37 |
| 3,310,345 A | * | 3/1967 | Rowden | 298/35 M |
| 3,361,478 A | * | 1/1968 | Ross, Jr. et al. | 298/35 M |
| 3,362,085 A | * | 1/1968 | Clifford et al. | 34/90 |
| 3,404,650 A | * | 10/1968 | Miller et al. | 114/29 |
| 3,427,075 A | | 2/1969 | Kress et al. | |
| 3,596,565 A | | 8/1971 | Atkinson | |
| 3,741,608 A | * | 6/1973 | Webb | 298/17 S |
| 3,759,573 A | * | 9/1973 | Rosenbaum | 298/29 |
| 3,768,184 A | | 10/1973 | Sunderlin | |
| 3,806,198 A | * | 4/1974 | Fikse | 298/30 |

(Continued)

FOREIGN PATENT DOCUMENTS

JP          09195321 A   *   7/1997

(Continued)

OTHER PUBLICATIONS

International Search Report and Written Opinion for PCT/US2007/001349, filed Jan. 19, 2007 (mailed Dec. 13, 2007).

(Continued)

*Primary Examiner* — H Gutman
(74) *Attorney, Agent, or Firm* — Holland & Hart LLP

(57) ABSTRACT

An automated gate control system for a vehicle with a load carrying portion capable of carrying a load of material selectively distributable through a gate comprises a driver-accessible control module and a gate actuating mechanism. The driver-accessible control mechanism is positionable within reach of a driver of the vehicle. The gate actuating mechanism is controllably linked to and responsive to control signals from the driver-accessible control module to open and to close the gate to distribute material through the gate as desired. As a result, the driver need not exit the vehicle to move the gate before, after or during a material distribution operation.

11 Claims, 21 Drawing Sheets

U.S. PATENT DOCUMENTS

| | | | | |
|---|---|---|---|---|
| 3,843,206 A | * | 10/1974 | Teagle | 303/7 |
| 3,863,986 A | * | 2/1975 | Mentessi | 298/35 M |
| 3,910,635 A | * | 10/1975 | Holland | 298/35 M |
| 3,917,084 A | * | 11/1975 | Swisher, Jr. et al. | 414/523 |
| 3,966,255 A | * | 6/1976 | Licari | 298/35 M |
| 3,980,336 A | * | 9/1976 | Bitonti | 298/23 M |
| 3,981,539 A | * | 9/1976 | Proeschl et al. | 298/35 M |
| 4,009,906 A | * | 3/1977 | Sweet et al. | 298/27 |
| 4,082,357 A | * | 4/1978 | Schmidt et al. | 298/27 |
| 4,192,551 A | * | 3/1980 | Weimer et al. | 299/1.4 |
| 4,326,750 A | * | 4/1982 | Rosenbaum | 298/35 M |
| 4,688,488 A | * | 8/1987 | Adams et al. | 105/253 |
| 4,766,820 A | * | 8/1988 | Ritter et al. | 105/240 |
| 4,898,427 A | * | 2/1990 | Francis | 298/22 C |
| 5,006,033 A | * | 4/1991 | McConnell | 414/477 |
| 5,113,825 A | * | 5/1992 | Takahashi | 123/400 |
| 5,131,722 A | | 7/1992 | DeCap | |
| 5,143,506 A | * | 9/1992 | Sticht | 414/421 |
| 5,147,011 A | * | 9/1992 | Hvolka | 37/411 |
| 5,284,097 A | | 2/1994 | Peppin et al. | |
| 5,294,186 A | | 3/1994 | DeCap | |
| 5,324,097 A | | 6/1994 | Decap | |
| 5,359,942 A | | 11/1994 | Ward | |
| 5,448,856 A | * | 9/1995 | Moore et al. | 49/340 |
| 5,549,359 A | | 8/1996 | Hoss et al. | |
| 5,606,916 A | | 3/1997 | Murray | |
| 5,999,087 A | * | 12/1999 | Gunton | 340/309.5 |
| 6,217,122 B1 | * | 4/2001 | Kirbie | 298/17.5 |
| 6,416,133 B2 | | 7/2002 | Friesen | |
| 6,431,084 B1 | | 8/2002 | Gaydos | |
| 6,749,268 B1 | | 6/2004 | Wheeler et al. | |
| 6,866,465 B2 | * | 3/2005 | Jester et al. | 414/556 |
| 0,234,622 A1 | | 10/2005 | Pillar et al. | |
| 7,306,291 B2 | * | 12/2007 | Hicks | 298/8 H |
| 7,559,732 B2 | * | 7/2009 | Khan et al. | 414/408 |
| 7,559,733 B2 | * | 7/2009 | Khan et al. | 414/408 |
| 2001/0002766 A1 | | 6/2001 | Friesen | |
| 2004/0042884 A1 | * | 3/2004 | Jester et al. | 414/501 |
| 2004/0049324 A1 | | 3/2004 | Walker | |
| 2006/0271263 A1 | * | 11/2006 | Self et al. | 701/50 |
| 2008/0211289 A1 | | 9/2008 | Beiler et al. | 298/19 R |
| 2008/0244859 A1 | * | 10/2008 | Maybury | 15/340.2 |
| 2009/0164074 A1 | * | 6/2009 | Cui | 701/51 |
| 2009/0191034 A1 | | 7/2009 | Mcghee et al. | 414/373 |
| 2009/0297305 A1 | * | 12/2009 | Autrey | 414/425 |

FOREIGN PATENT DOCUMENTS

| | | | |
|---|---|---|---|
| JP | 09268603 A | * | 10/1997 |
| JP | 11269938 A | * | 10/1999 |

OTHER PUBLICATIONS

Western Service Center—Trailer Parts, Remote Control for Ross Valve, http://estore.websitepros.com/1173368/-strse-292/Power-Cord,-For-Ross/Detail.bok, (Printed Jan. 16, 2007).

Western Service Center—Trailer Parts, Infinite Gate Control Valve, http://estore.websitepros.com/1173368/-strse-295/Infinite-Gate-Control-Valve/Detail.bok, (Printed Jan. 16, 2007).

* cited by examiner

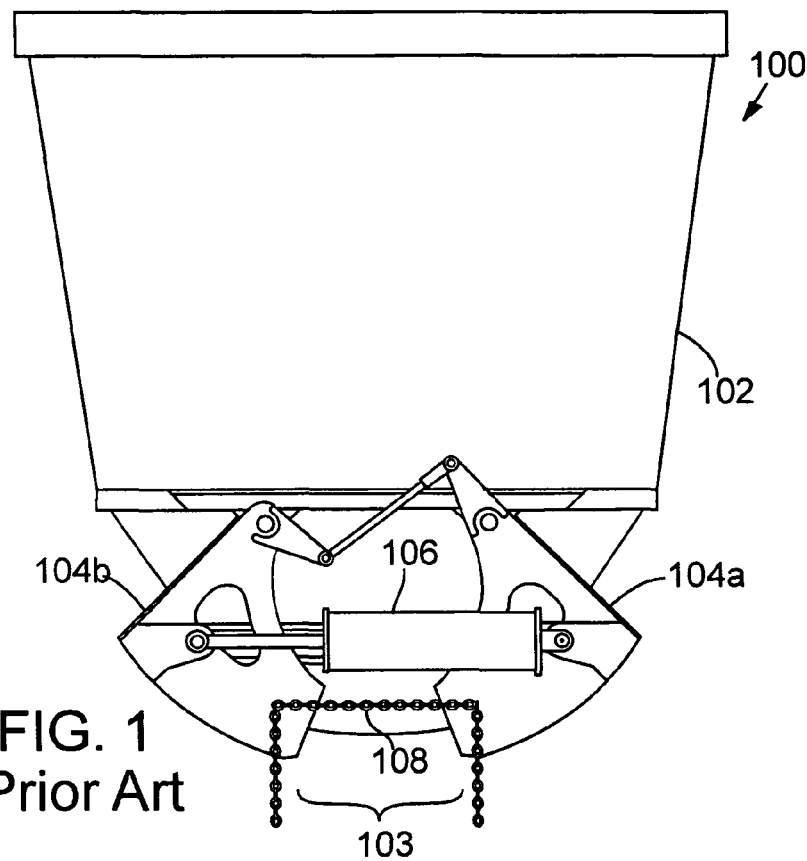
FIG. 1 Prior Art
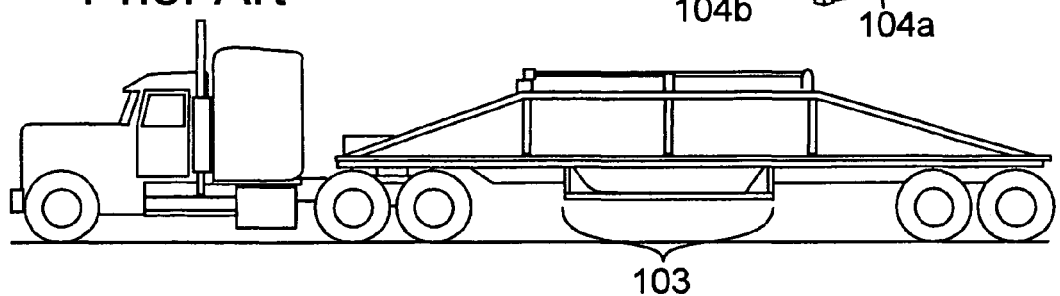
FIG. 2A Prior Art
FIG. 2B Prior Art

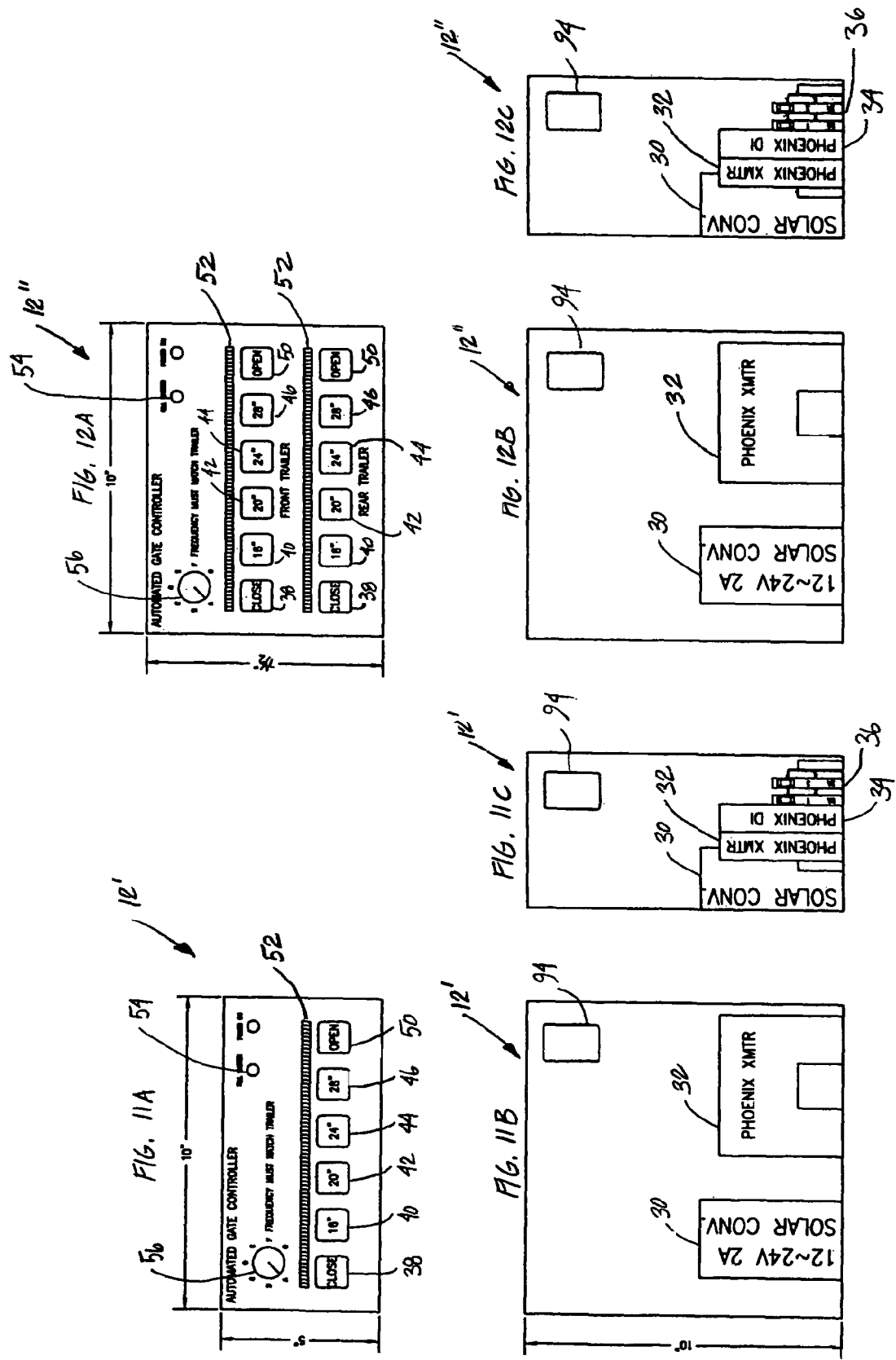

AUTOMATED GATE CONTROL AND METHODS

CROSS REFERENCE TO RELATED APPLICATION

This application claims the benefit of prior U.S. Provisional Patent Application No. 60/760,611, which was filed on Jan. 20, 2006. The prior application is incorporated herein by reference.

FIELD

This application is directed to apparatus, systems, and methods for controlling the width of a gate on a load carrying vehicle. In particular embodiments, the approach provides a gate whose width is remotely controllable.

BACKGROUND

Belly dumps, also known as bottom dumps, or semi-bottom dumps, are trailers that are towed by a truck and used for the delivery of aggregate materials from the trailers through one or more openings (called "gates"). Belly dump trailers are a useful tool on the jobsite because they carry a larger payload than a standard dump truck, they can be unloaded faster than a transfer rig, and they are safer than an end dump trailer. One very useful advantage that a belly dump trailer has on a jobsite is that it has the capability of "windrowing" its cargo. This is especially advantageous during a grading operation or for paving purposes.

During a grading or paving operation, the windrow is set at a proper size to accommodate the work being done. Windrows that are too heavy or too light have a dramatic effect on productivity for the grading or paving crew.

FIGS. 1, 2A and 2B illustrate the way that most of the current trailers control the windrow size. Although there are trailers that employ a "pin" or manual "stop" system, they all require the driver to manually set them each time the trailer dumps. The reason that resetting the stops or chains each trip is necessary is that, with the gates not fully open, some of the cargo will sit on the gates inside the trailer and not get dumped out. This means that the cargo gets hauled back to the source and, whether paying by volume or weight, gets purchased again. To avoid this from happening, the stops or chains must be removed each time so that the gates can be fully opened to empty all cargo.

Currently, the driver of the vehicle must stop the truck, exit the driver's seat and cab of the truck, manually set a series of chains that will retain the gates at a width determined by the length of the chain, re-enter the cab of the truck, spread the cargo, close the gates, exit the truck again and remove the chains, and finally, re-enter the cab of the truck and open the gates to a full open position to empty all of the remaining cargo. Now the gates can be closed for another load. Another method to control the spread is to have a person walk along beside the trailer and manually operate a remote valve that is mounted on the trailer and watch the spread making necessary adjustments. This is a very difficult way to get any kind of consistency.

Some approaches to remote gate control are known, but these are understood to require operation of the gate from outside of the vehicle, such as via a corded connection to a handheld unit or via a wireless connection. Thus, these approaches still suffer from the drawbacks of requiring the driver to exit the vehicle each time the gate is moved, or to have another individual perform this function, which is not efficient. Also, it would be desirable to provide a safer alternative than requiring the driver or another person to be present in the in the immediate vicinity of the dumping operation, especially in the case of dumping operations carried out with moving vehicles. Further, none of the prior approaches appear to provide for consistent control of the extent of the gate opening to allow for repeatable results, both in successive dumping trips or by different vehicles.

SUMMARY

Described below are embodiments of an automated gate control system for load carrying vehicles and associated methods that address some of the problems of the prior art approaches.

According to some embodiments, an automated gate control system for a vehicle with a load carrying portion capable of carrying a load of material selectively distributable through a gate comprises a driver-accessible control module and a gate actuating mechanism. The driver-accessible control mechanism is positionable within reach of a driver of the vehicle. The gate actuating mechanism is controllably linked to and responsive to control signals from the driver-accessible control module to open and to close the gate to distribute material through the gate as desired. As used herein, a "gate" refers to any structure used to open and close a single opening for distributing material in a load carrying vehicle, whether the structure is provided as a single moving part or a pair of moving parts.

The gate actuating mechanism can be controllable to open and to close when the vehicle is in motion. The gate actuating mechanism comprises a wireless link or a wired link to the control module.

The gate control system can comprise a master control module positioned remote from the vehicle, wherein the gate actuating mechanism is wirelessly linked to the master control module and is selectively responsive to signals received from the master control module.

The driver-accessible control module can be mounted to a dashboard of the vehicle. The driver-accessible control module can comprise a display that displays information to the driver, a power connection that provides electrical power to the control module and a control circuit comprising at least a transmitter for sending wireless control signals to the gate actuating mechanism. The driver-accessible control module can comprise a memory for storing information. The driver-accessible control module can comprise a receiver capable of receiving signals.

The transmitter can be capable of transmitting at different frequencies, wherein the driver can select any desired one of the different frequencies using the driver-accessible control module. In some embodiments, the control module can be configured to be responsive to voice commands from the driver.

The driver-accessible control module can comprise a DC power connection connectable to a battery of the vehicle and a DC power distribution bus. The display can be capable of displaying information indicating a position of the gate relative to open and closed positions. In some embodiments, the driver can select from a plurality of predetermined gate opening sizes using the control module.

The gate actuating mechanism can include an actuator connectable to the gate and capable of moving the gate between open and closed positions and holding the gate in intermediate positions between the open and closed positions. The actuator can be a linear actuator. The actuator can be a pneumatic actuator or a hydraulic actuator.

In some embodiments, the gate control system comprises a position sensor mountable to the load carrying portion adjacent the gate and capable of sensing a position of the gate. In some embodiments, the position sensor is integrated with an actuator.

In some embodiments, the gate actuating mechanism comprises a linear actuator operable to move the gate between open and closed positions and to hold the gate in any desired intermediate position between the open and the closed positions, a remote gate control unit positioned to receive control signals from the control module and comprising a control circuit capable of generating actuator control signals, wherein the linear actuator extends and retracts according to control signals received from the control circuit, thereby causing the gate to open and to close. In some embodiments, the gate actuating mechanism controls the positioning of the actuator using feedback from the position sensor of the actuator.

The remote gate control module can comprise a power connection capable of receiving power from a battery of the vehicle.

In some embodiments, the load carrying vehicle is a tractor connected to a separate trailer, such as a belly dump trailer or the like, and wherein the driver occupies a driver's seat in the tractor when the vehicle is being driven and the trailer comprises the load carrying portion.

It can thus be seen that there are many aspects of the present disclosure, including many other additional or alternative features that will become apparent as this specification proceeds. It is therefore understood that the scope of protection is to be determined by the claims as issued and not by whether the claim subject matter solves any particular problem or all of them, provides any particular features or all of them, or meets any particular objective or group of objectives set forth in the Summary above.

BRIEF DESCRIPTION OF THE DRAWINGS

FIG. 1 is a schematic end view of a portion of a trailer showing a conventional gate or windrow requiring manual operation;

FIG. 2A is a side view of a tractor trailer combination having a trailer with a conventional manually movable gate covering an opening, which is suitable for retrofitting with the automated gate approach described herein.

FIG. 2B is a magnified perspective view of a portion of the trailer of FIG. 2A showing the gate in a closed position.

FIG. 11A is an elevation view of a front face of the driver-accessible control module suitable for controlling a single gate.

FIG. 11B and FIG. 11C are a bottom view and a side view, respectively, of the driver-accessible control module of FIG. 11A showing major components of the circuit.

FIG. 12A is an elevation view of a front face of the driver-accessible control module suitable for controlling two gates.

FIGS. 12B and FIG. 12C are a bottom view and a side view, respectively, of the driver-accessible control module of FIG. 12A showing major components of the circuit.

DETAILED DESCRIPTION

Figure 19:
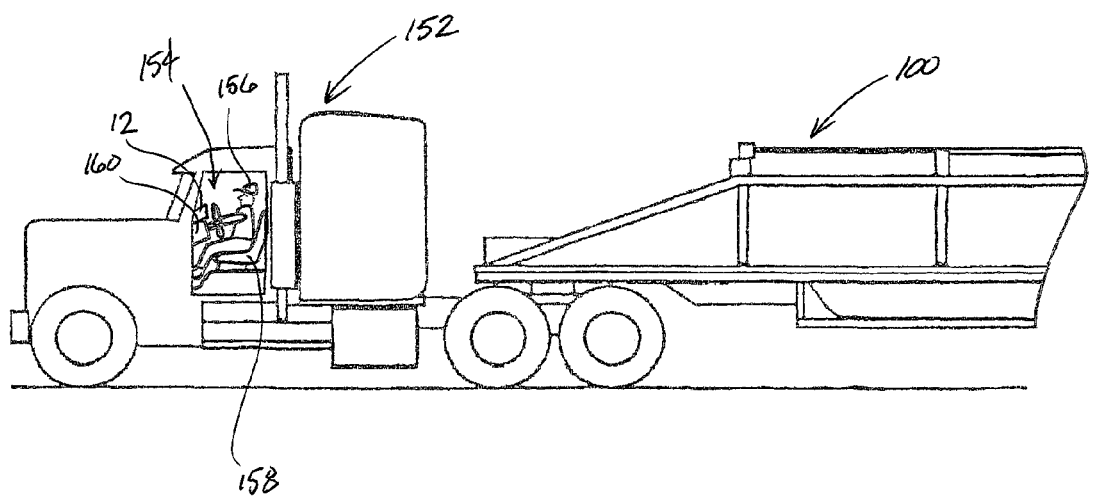
FIG. 19 is a partial side view of a tractor trailer combination with the driver's side door of the tractor removed.

Described below are embodiments of an automated gate control system suitable for vehicles having a load carrying portion. Some embodiments are particularly well suited for implementation with tractor trailer combination vehicles in which a tractor 152 tows one or more trailers 100, such as, e.g., belly dump trailers (see FIG. 19). In some embodiments, the system allows a driver 156 of the vehicle to actuate the gate or gates of the vehicle's load carrying portion remotely without requiring the driver to exit the vehicle. Thus, the driver can distribute material from the load carrying portion onto desired areas of the surface over which the vehicle is traveling by the action of gravity. In some embodiments, the driver can actuate the gates from the driver's area 154 while the vehicle is in motion, which can help to achieve a desired distribution of the material and to speed the distribution process. The driver can control the gates to move between a closed position and a fully open position, and in some embodiments, one or more intermediate open operating positions between the closed position and fully open position. The operating positions have different open areas through which the material can be distributed, which can be defined for some embodiments according to the respective widths of these areas. Thus, the driver can control the size of the open area for distributing material for a desired duration. In some embodiments, a remote operator can control the gates for one or more vehicles, either instead of or in concert with control by the respective drivers of those vehicles. Control of a gate control mechanism that moves the gates can be accomplished by a wireless or wired link between the driver (or remote operator) and the gate control mechanism.

FIG. 1 shows a portion of a conventional belly dump trailer 100 viewed in elevation. The trailer 100 has a load carrying portion 102 and a horizontally oriented opening 103 extending along a portion of the trailer's length (see also FIG. 2A) that is opened and closed by a gate. The gate members 104*a*, 104*b* are shown in an operating position between the closed position and the fully open position. The gate members are moved between the various positions by an actuator 106. In conventional trailers, the actuator 106 is usually a pneumatic actuator (also called an air cylinder) that is connected to the trailer's overall pneumatic system that is used to operate other components, such as, e.g., air brakes. Typically, there is an actuator 106 positioned at each end of the gate, but in certain applications, only a single actuator is used.

As shown in FIG. 1, the conventional actuator 106 cannot hold the gate members 104*a*, 104*b* in their desired positions as shown, so a chain or other spacing member 108 is attached to each of them to maintain them in the desired positions for the selected size of open area. FIG. 2B shows another view of the trailer 100 and the gate members 104*a*, 104*b*.

Figure 3:
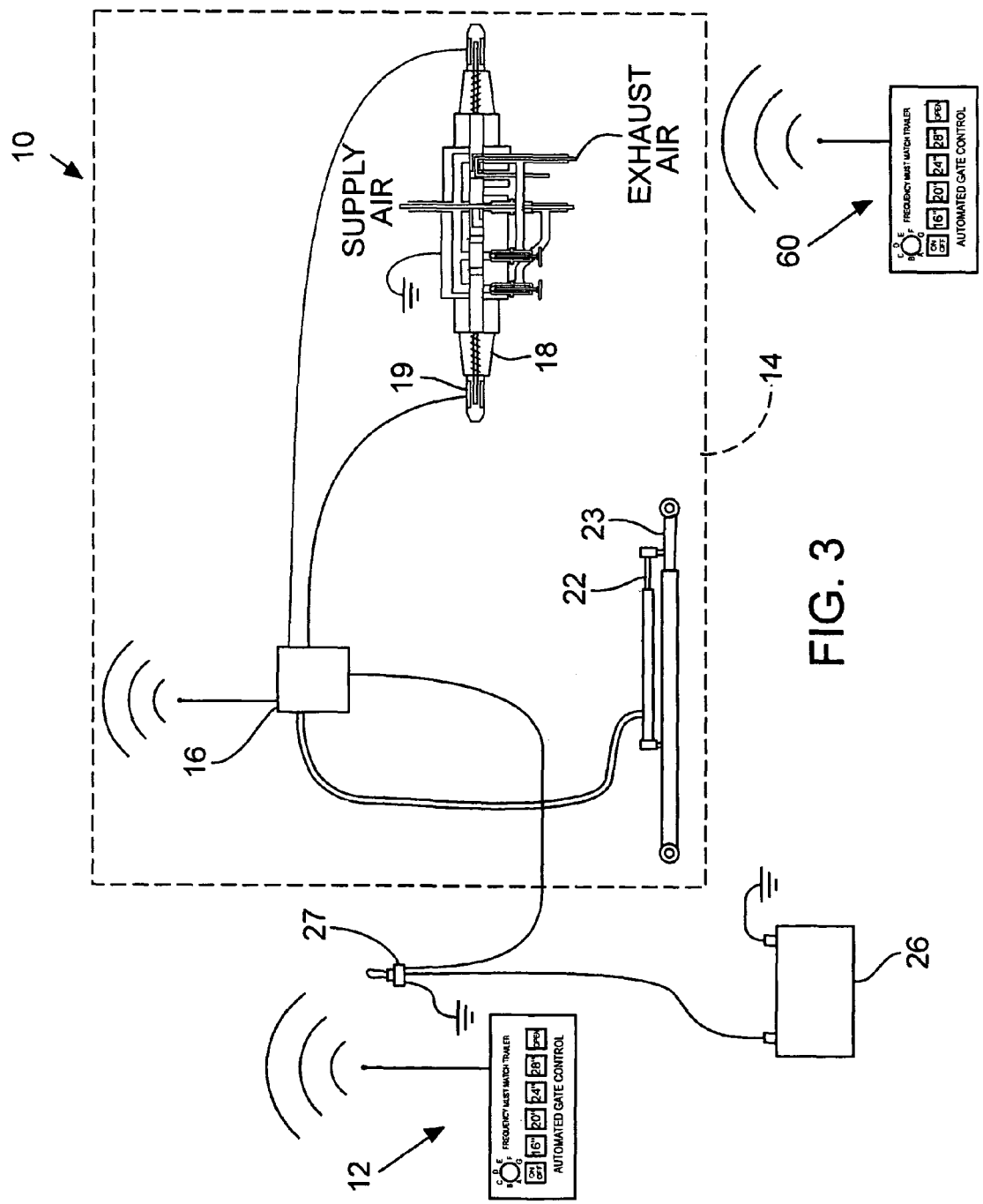
FIG. 3 is a schematic of an embodiment of the automated gate control system that includes a driver-accessible control module, a gate actuating mechanism that includes a remote gate control unit in communication with the driver-accessible control module and controllably linked to an actuator that moves the gate.

FIG. 3 is a schematic of an automated gate control system 10 according to this application. The system 10 can include a driver-accessible control module 12, which has a wireless link to a gate actuating mechanism 14, and specifically, to a remote gate control module 16 of the gate actuating mechanism 14. The gate actuating mechanism 14 is positioned adjacent the load carrying portion of the vehicle, such as in the vicinity of the gate or gates to be operated.

The gate actuating mechanism 14, which is described in greater detail below, also includes a valve assembly 18 controllably linked to the control module 16 and an actuator or actuators 20 (see FIG. 7) positioned to move the gate or gates. The valve assembly 18 controls the flow of a pressurized working fluid, such as air, hydraulic fluid or another suitable fluid to extend and retract the actuator 20. The gate actuating mechanism 14 can also include a position sensor 22 that allows the positions of the actuator 20 (and, correspondingly, the gate or gates moved by it) to be communicated to the control module 16, such as, e.g., for feedback control. Thus, following a command to extend the opening to a 28" width, for example, the control algorithm will continue to extend the actuator until the position sensor feeds back a position reading corresponding to a 28" width opening, within predetermined acceptable tolerances set for the process.

Driver-Accessible Control Module

Figure 4:
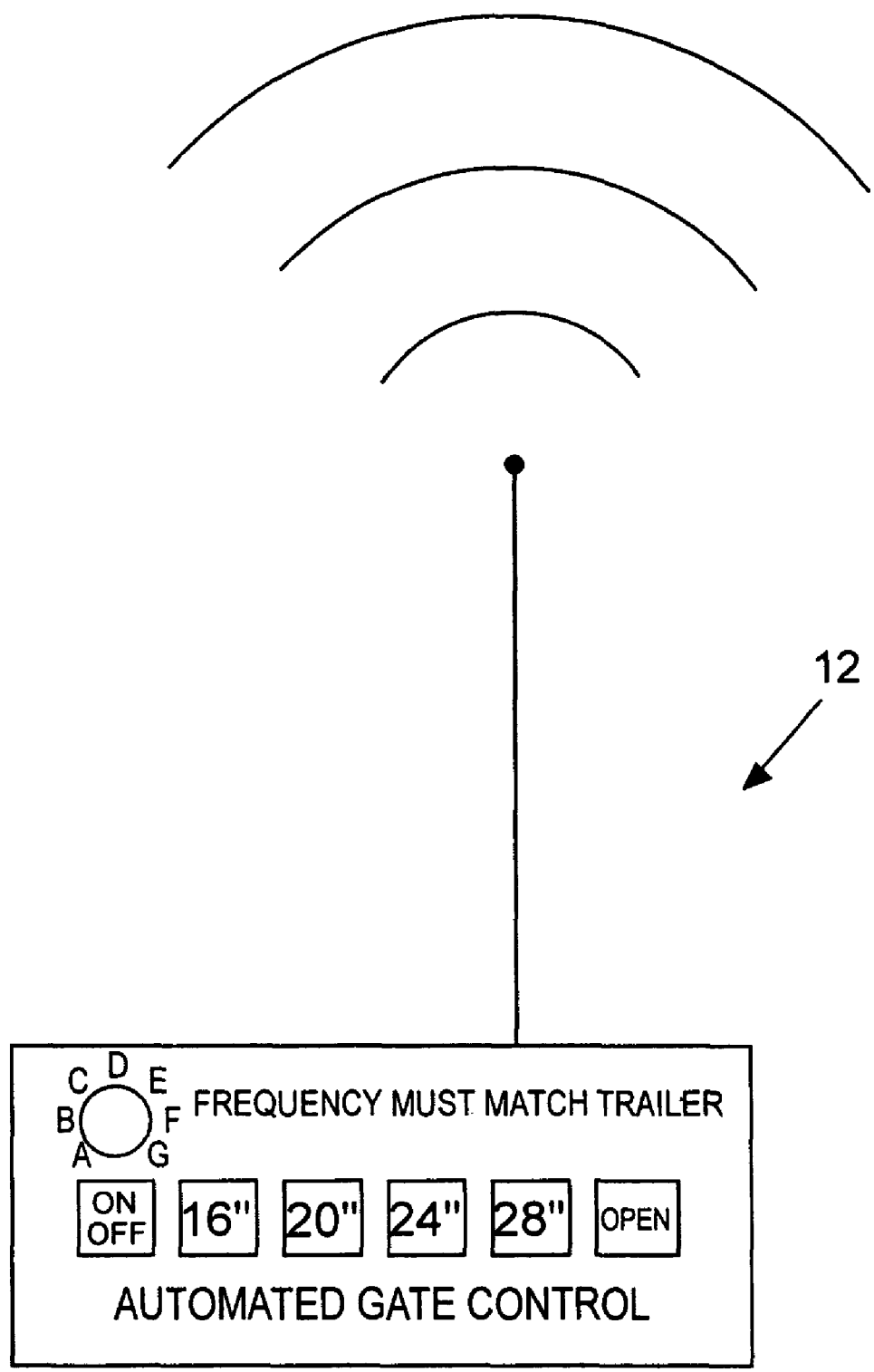
FIG. 4 is a front view of a representative driver-accessible control module.

FIG. 4 is a schematic front view of an embodiment of the driver-accessible control module 12. FIGS. 11A, 11B and 11C are additional views of a slightly modified driver-accessible control module 12', which is also for controlling a single gate. FIGS. 12A, 12B and 12C are views of a driver-accessible control module 12" for controlling two gates, such as for a two-trailer situation where each trailer has a single gate.

The driver-accessible control module is configured to be positioned within reach of the driver of the vehicle, i.e., for easy access by the driver while the driver is operating the vehicle. For example, the driver-accessible control module can be positioned on the dashboard 160, built-in with other instrumentation or placed at another location convenient for access during vehicle operation. Thus, the driver 156 may remain in the driver's area 154 seated in his seat 158 while operating the gate (see FIG. 19).

The driver-accessible control module 12 includes a housing 24 that houses part of a circuit. Referring to FIGS. 3, 11A, 11B, 11C, 12A, 12B, 12C, 13A and 13B, the major components of the circuit include a source of power, such as the vehicle battery 26, a master switch 27, a DC-to-DC converter 30, a two-way radio frequency transmitter 32, a digital input card 34 and terminal connections 36.

The master switch 27 is turned on to power the system. Turning off the master switch 27 can be configured to cause the system to automatically close the gate or gates. With the master power turned off, the system can be configured to prevent other command signals, such as from a grader or other party in a supervisory control role as explained below from exerting control. The master switch 27 is similar to the master switch on conventional trailers, except the master switch 27 is also connected to the driver-accessible control module.

Some conventional vehicles have 12V systems, whereas others have 24V systems. The DC-to-DC converter 30 converts the voltage of the battery 26, which may be 12V, to the voltage required for the circuit, which in this example is 24V. If the battery 26 is 24V, no such conversion is required. A suitable DC-to-DC converter is the Model EQ 12/24V-2 available from Solar Converters, Inc.

The two-way radio frequency transmitter 32 transmits radio signals from the driver-accessible control module 12, and receives radio signals from the gate actuating mechanism 14 and potentially other sources, as described in more detail below. A suitable two-way radio frequency transmitter is the Model RADISM90080BDBUS available from Phoenix. A suitable digital input card is the Model RADIN8D available from Phoenix.

Figure 14A:
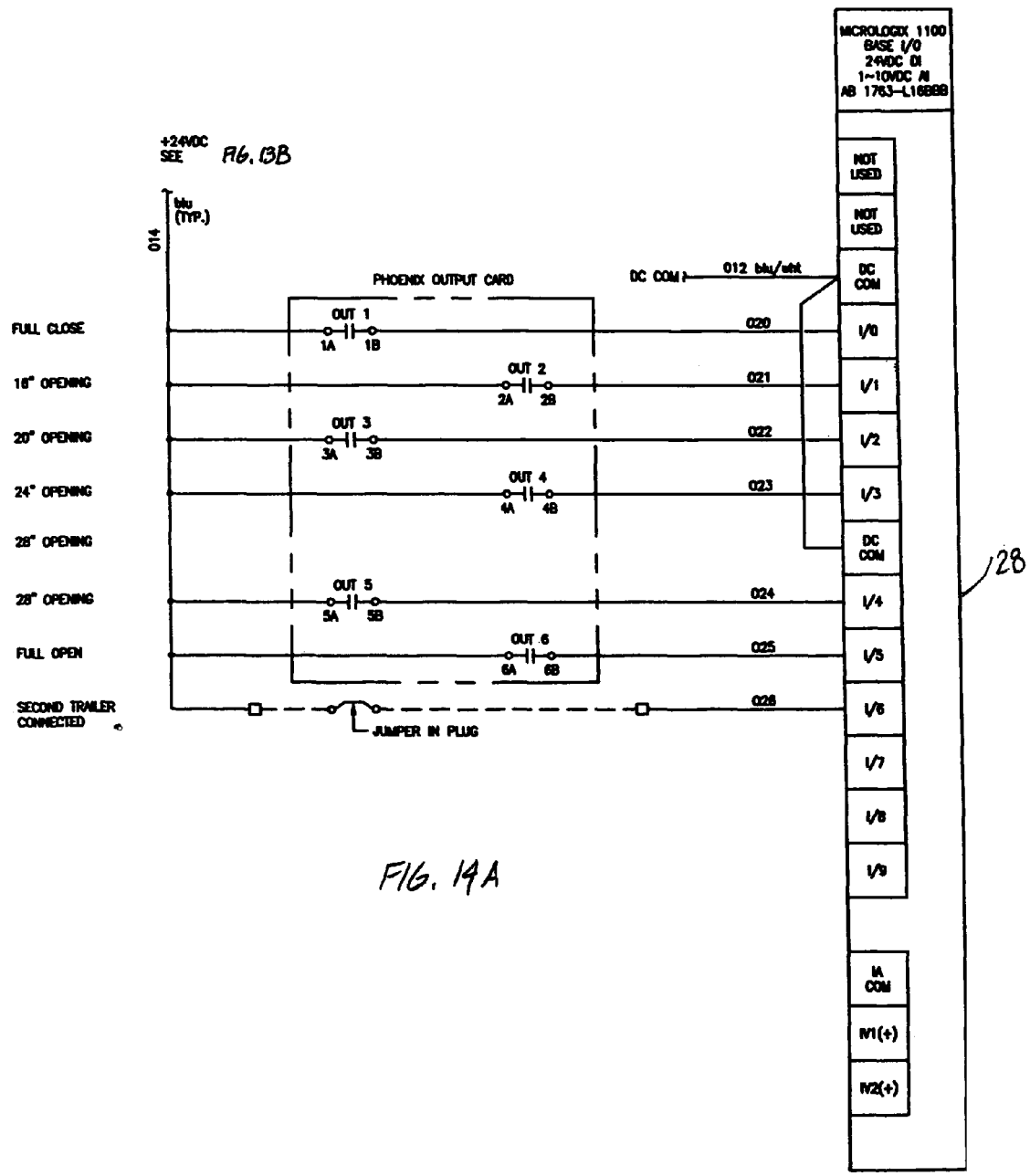
FIG. 14A is a wiring diagram for the driver-accessible control module.
Figure 14B:
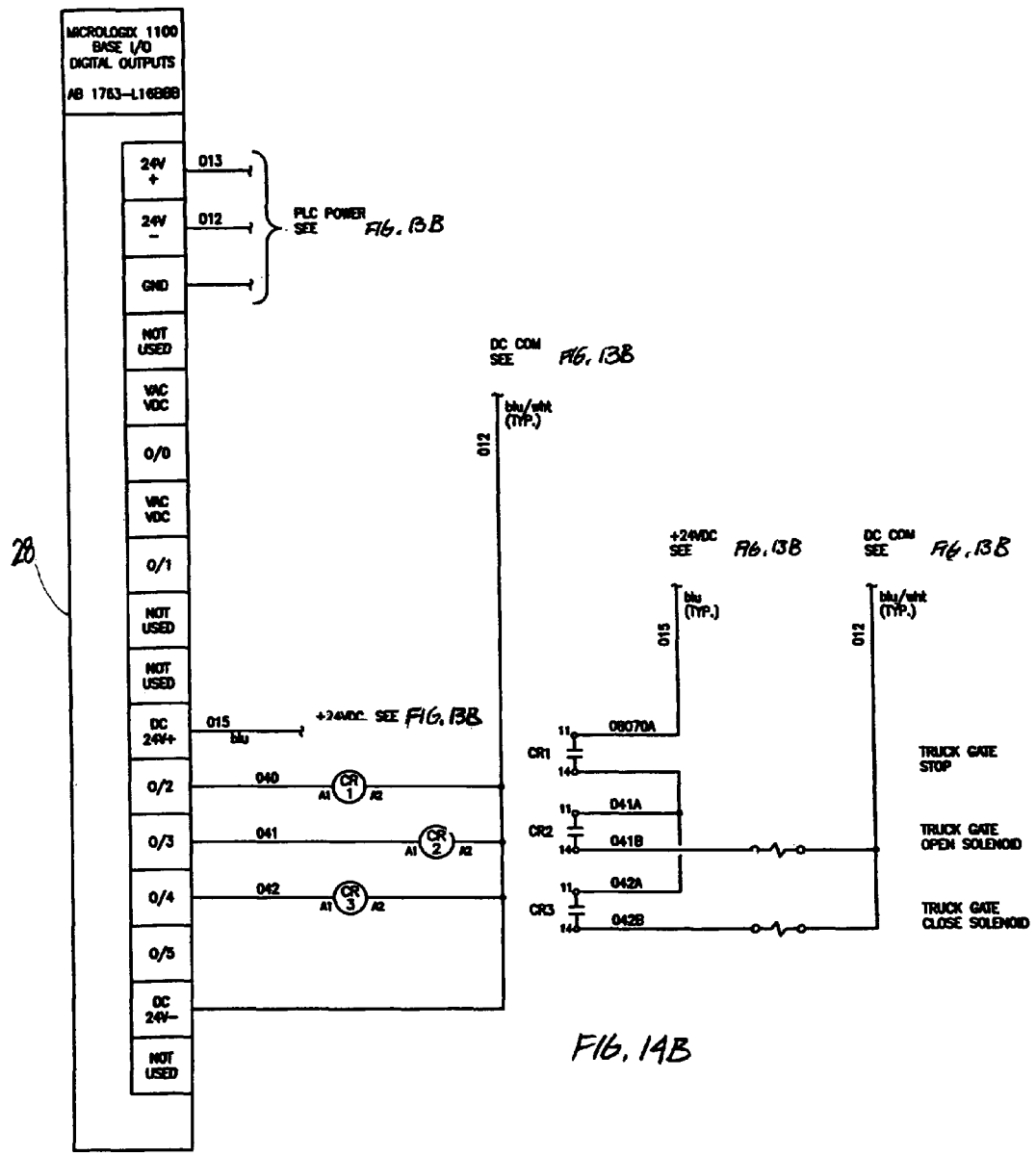
FIG. 14B is a wiring diagram showing the digital inputs to the remote gate control module.
Figure 14C:
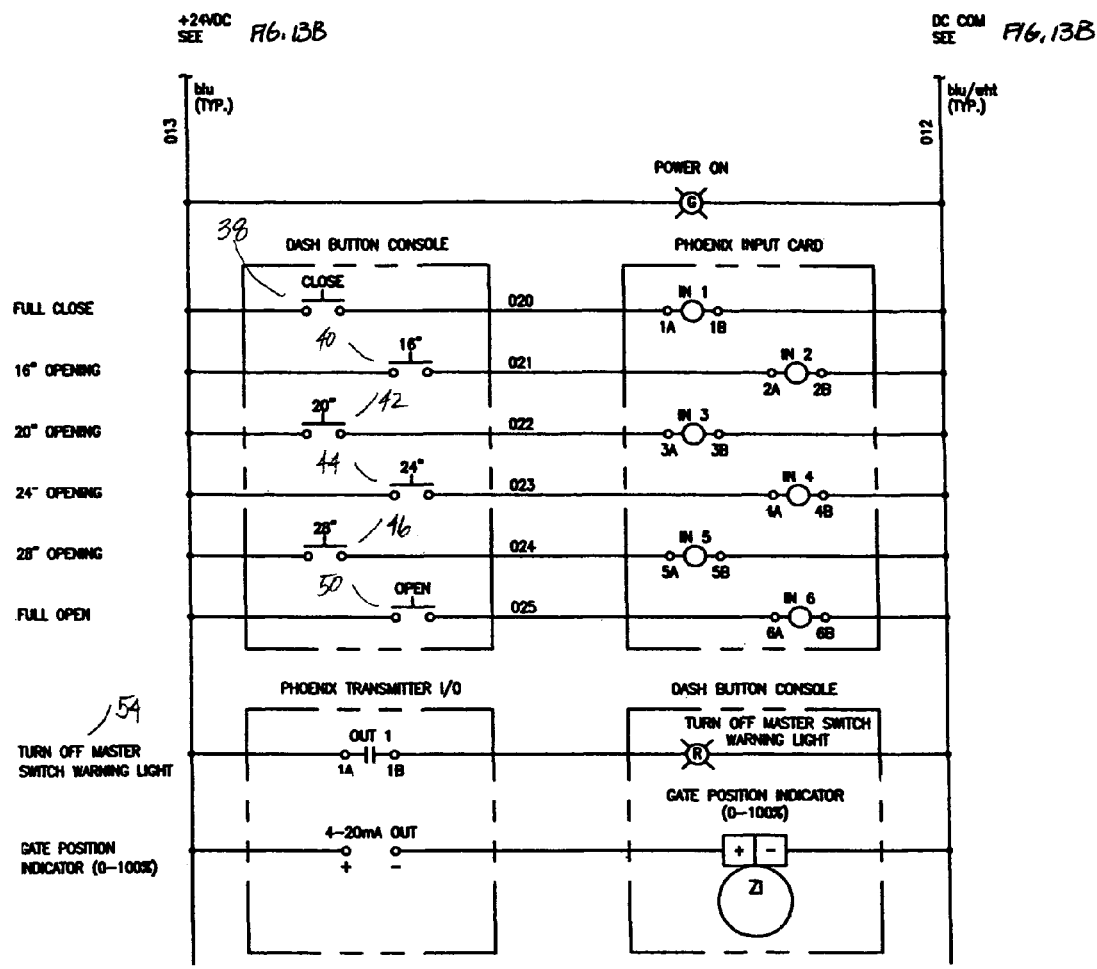
FIG. 14C is a wiring diagram showing the digital outputs from the remote gate control module.

FIG. 14C is an electrical schematic of the driver-accessible control module 12, showing the various actions that the driver can input and the resulting indications which can be displayed to the driver. Switches 38, 40, 42, 44, 46, and 50 can be actuated, with the respective indicator lamps being lit, to select the following actions, respectively: FULL CLOSE (to close the gate), 18" (to move the gate to the 18" open position), 20" (to move the gate to the 20" open position), 24" (to move the gate to the 24" open position), 28" (to move the gate to the 28" open position) and FULL OPEN (to move the gate to the fully open position). FIG. 12B shows a second set of these switches corresponding to a second gate to be controlled, such as on a second trailer.

Referring to FIG. 11A, a gate position indicator 52 functions to indicate to the driver the position of the gate relative to its fully opened and fully closed positions. The gate position indicator may be a linear LED bar graph or other suitable indicator. The master switch light 54 is lit when the master switch 27 is closed and power is provided to the system.

The driver-accessible control module 12 also has a frequency adjuster 56 that allows the driver to select from several different radio frequencies for communications between the driver-accessible control module 12 and the gate actuating mechanism 14.

Figure 13A:
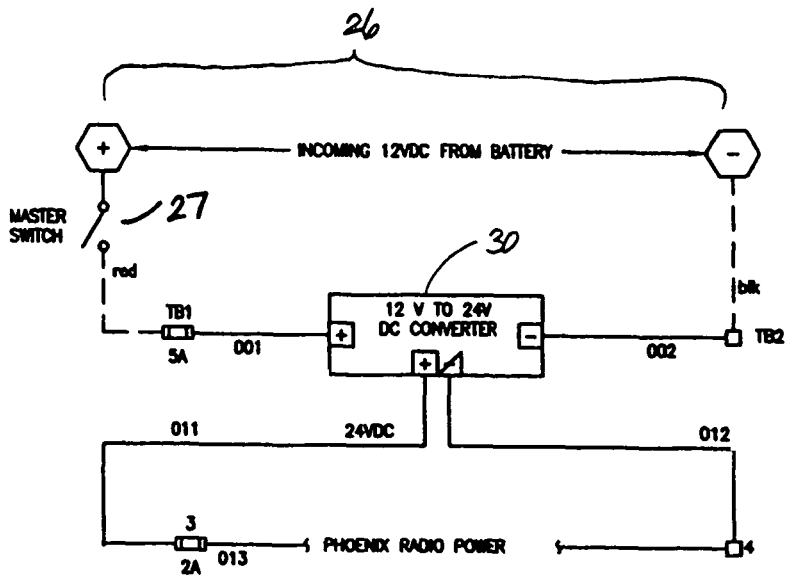
FIG. 13A is a schematic of an electrical circuit showing the electrical power distribution for operating the driver-accessible control module.

FIG. 13A is a power distribution schematic showing that electrical power from the battery 26 is converted from 12V to 24V and is supplied to power the radio frequency transmitter 32.

Gate Actuating Mechanism

As stated, the gate actuating mechanism 14 includes the control module 16. The control module 16 is an electrical component that receives power, e.g., from the vehicle battery 26. The control module 16 receives control signals, either wirelessly as in the illustrated embodiments or via a wired or other form of link, from the driver-accessible control module 12. The control signals received by the control module 16 are then used to control the position of the valve assembly, which in turn converts the electrical signals into movements of valves or other fluid control devices to control the working fluid and cause the actuator 20 to extend from, to retract from or to hold in its current position.

Figure 5:
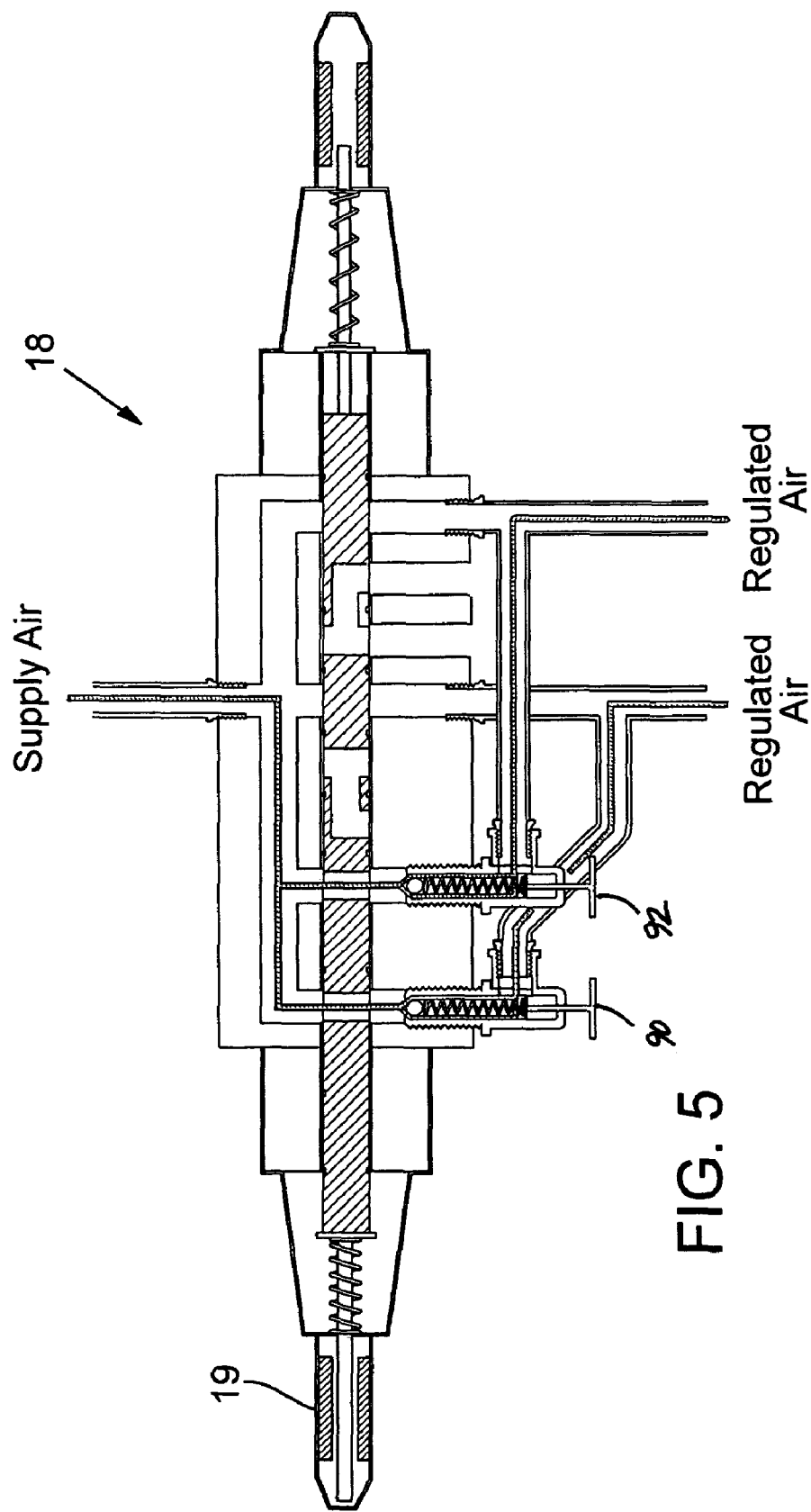
FIG. 5 is a schematic view of a pneumatic valve assembly connected to the vehicle's pneumatic system, which is shown in a state for holding the gate in a current position.
Figure 6:
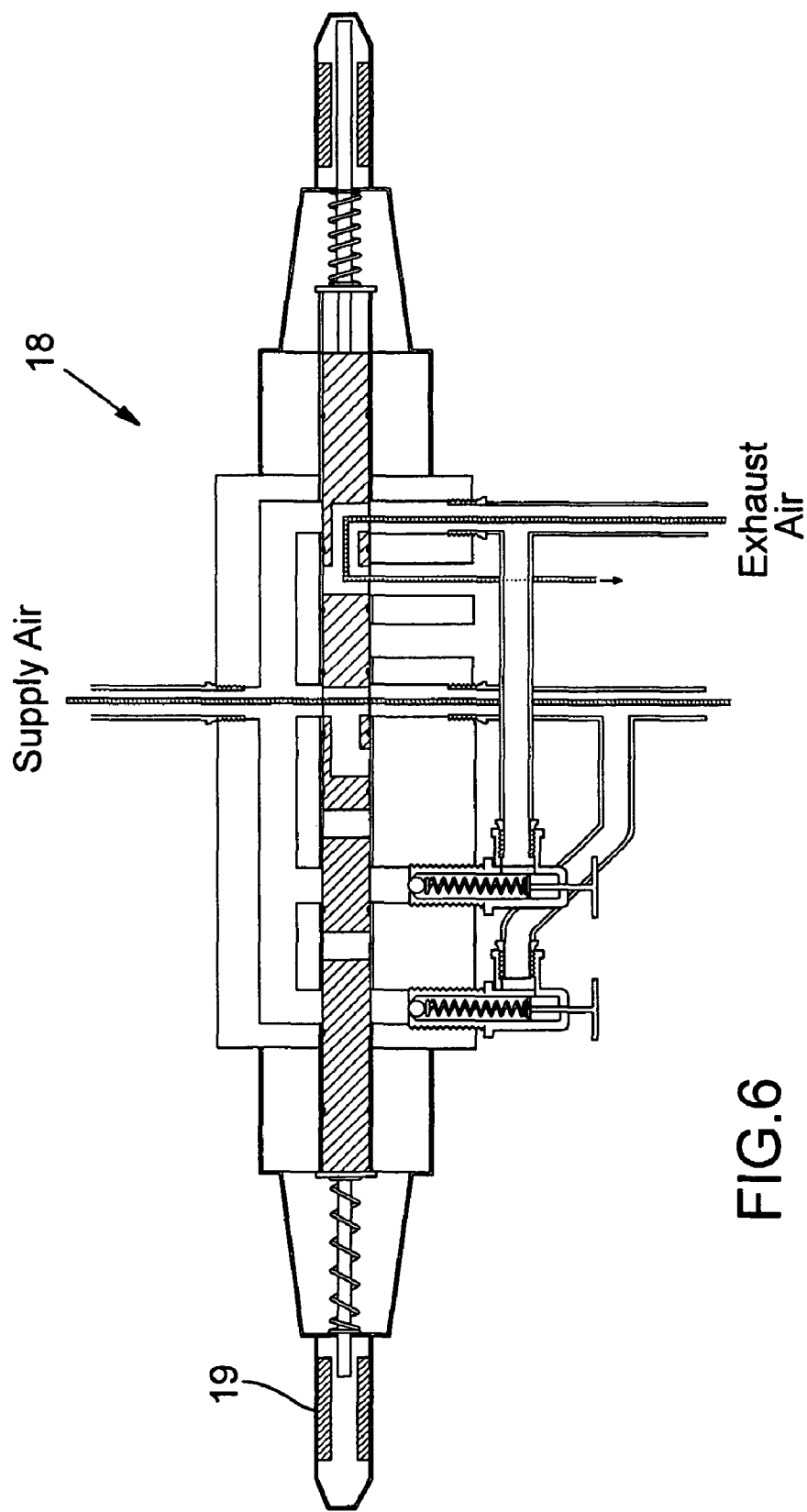
FIG. 6 is a schematic view of the valve assembly of FIG. 5, except showing the valve in its normal or closed position.
Figure 7:
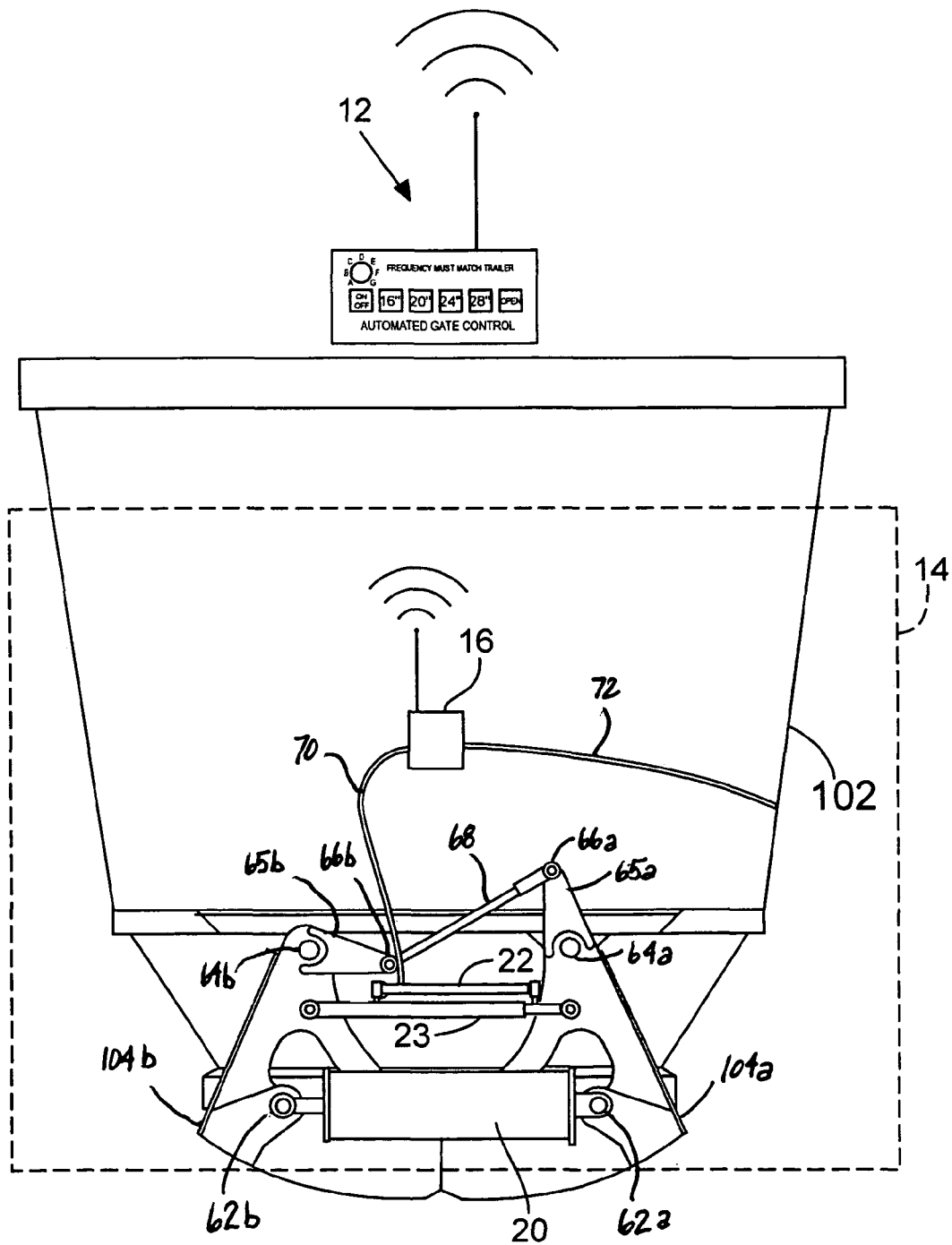
FIG. 7 is a view of the system showing the gate in the closed position in response to a command received from the driver-accessible control module.

FIG. 5 shows the valve assembly 18 when controlled to hold the actuator in its current position. As indicated, a spool 19 has been moved to the "hold" position. FIG. 6 shows the valve assembly when controlled to occupy its closed position. FIG. 7 is a view of the system showing the valve assembly 18 (and the respective gate) in their closed positions. The system can be configured such that the valve assembly 18 is in the closed position when there is no signal present.

Figure 8:
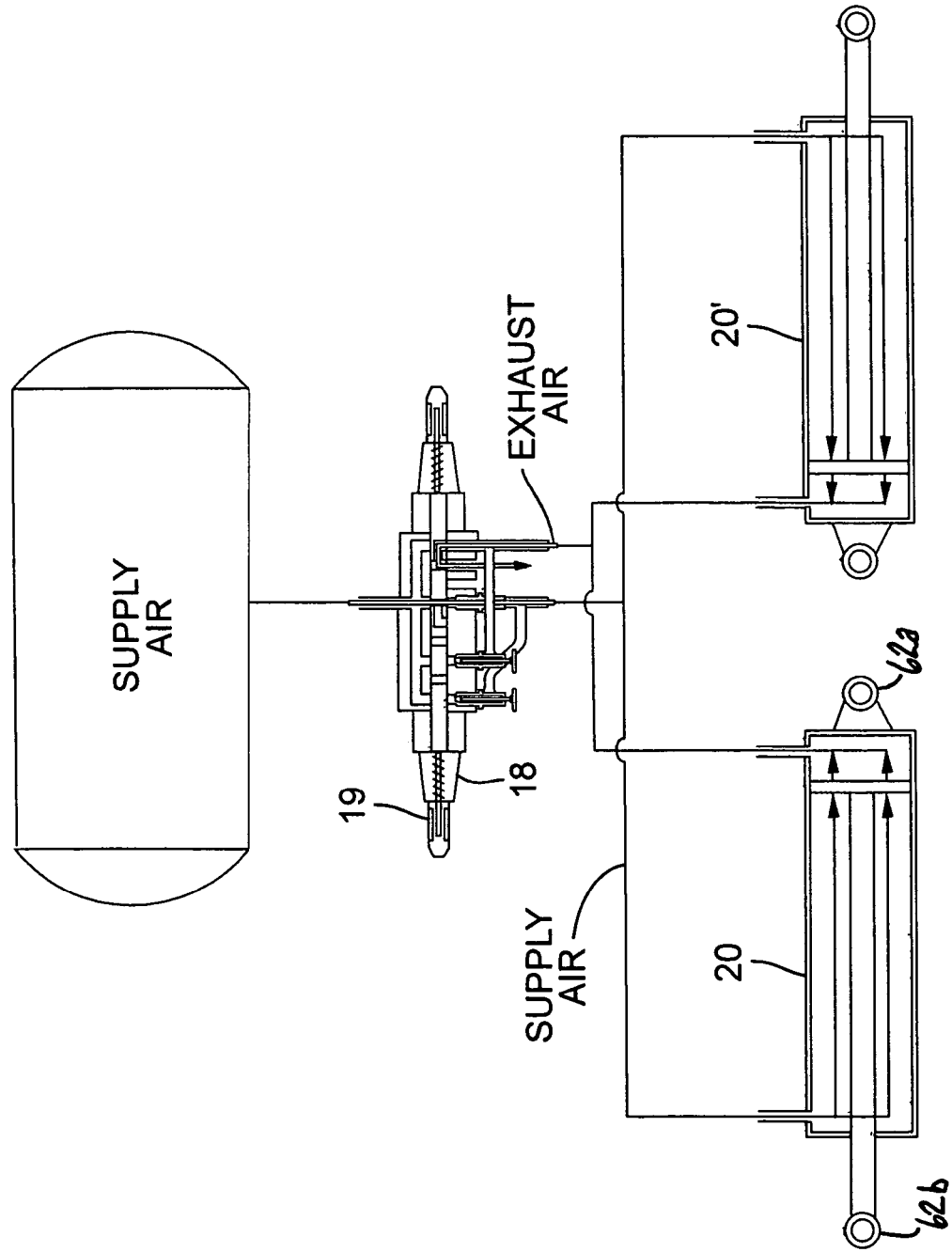
FIG. 8 is a schematic of the pneumatic circuit that includes the valve assembly of FIGS. 5 and 6 and a pair of actuators.

FIG. 8 is another view of the system with the gate and the valve assembly 18 in the closed position. In FIG. 8, both the actuator 20 and a second actuator 20', which may be positioned at an end of the gate opposite the actuator 20, are shown. FIG. 1 OA is similar to FIG. 8, except it shows the valve assembly 18 in the hold position and the actuators 20, 20' being held in an intermediate operating position between the fully open and fully closed positions.

Figure 10A:
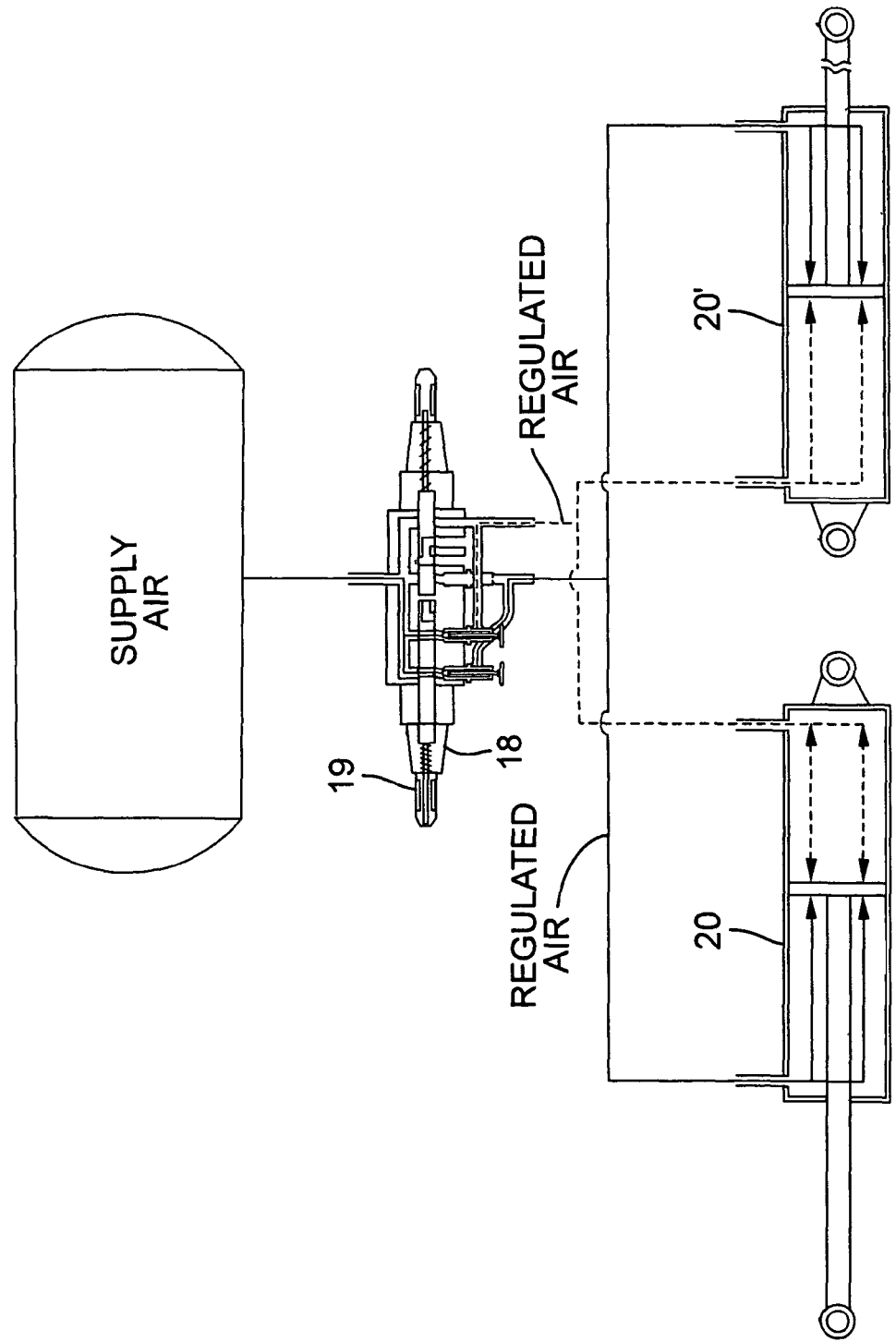
FIG. 10A is a schematic similar to FIG. 8, except showing the actuator in a "hold" position.
Figure 10B:
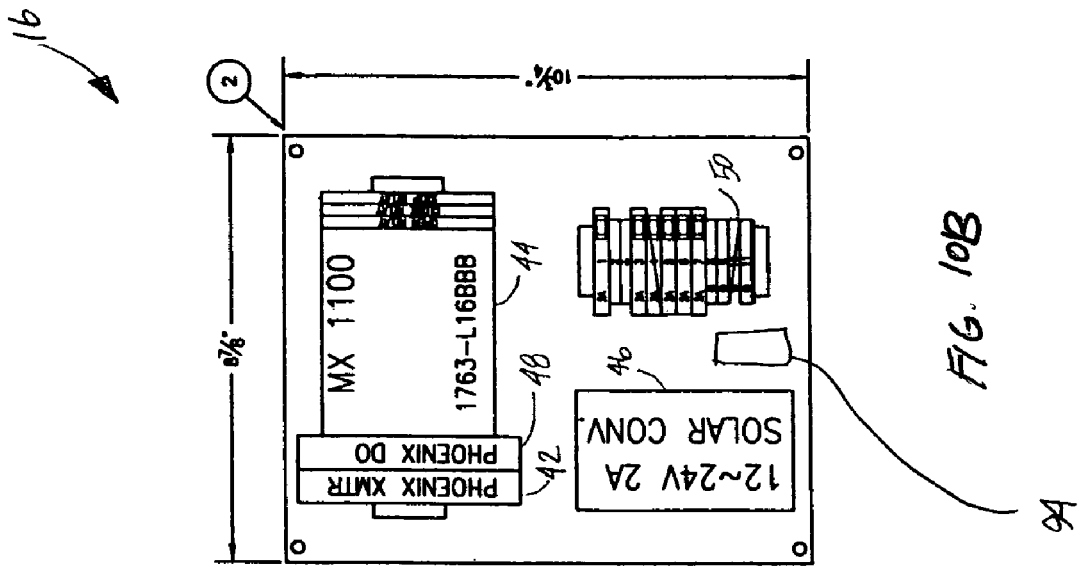
FIG. 10B is a plan view of an embodiment of the remote gate control unit showing major components of the circuit.
Figure 10C:
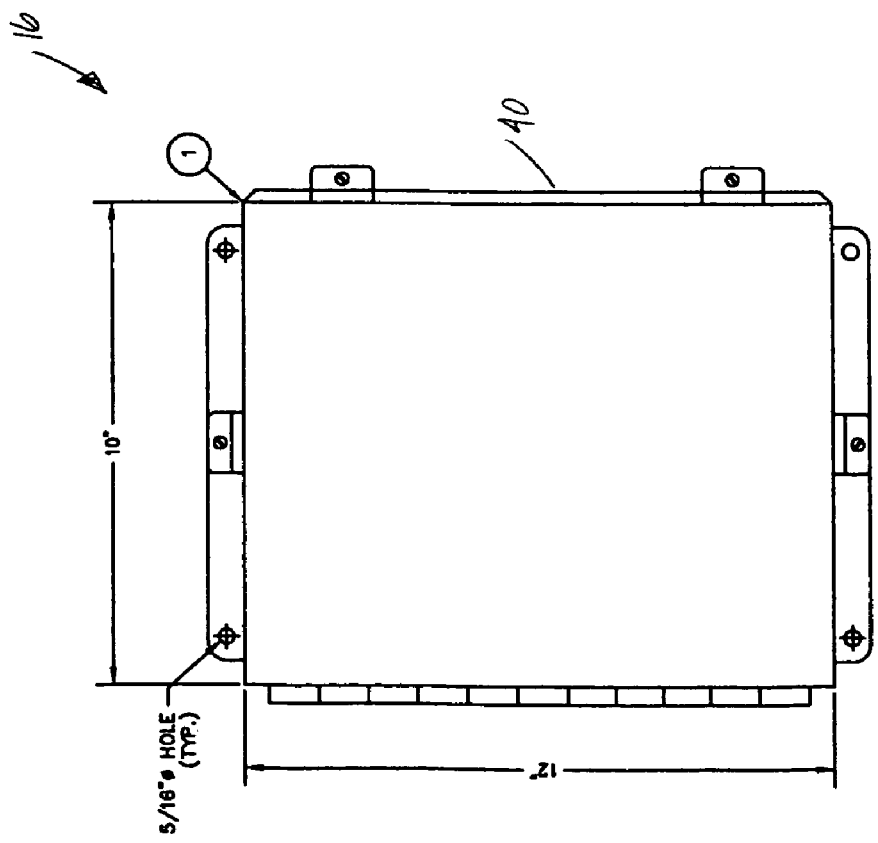
FIG. 10C is a plan view of an enclosure for housing the remote gate control unit circuit.

FIG. 10B and FIG. 10C show additional views of the control module 16. The control module 16 includes an enclosure 40 and a circuit having the following major components: a 2-way radio frequency transmitter 42, a microcontroller 44, a DC-to-DC converter 46, a digital output card 48 and a fuse block 50.

The radio frequency transmitter 42 receives control signals from the driver-accessible control module 12, and also sends signals, such as signals indicating a position of the actuator 18, to the driver-accessible control module 12. A suitable two-way radio frequency transmitter is the Model RADISM900BDBUS available from Phoenix.

The microcontroller 28 processes commands received by the control module 16 and sends control signals to the valve assembly 18. The microcontroller 28 can also receive and process signals, such as signals corresponding to the positions of the actuator(s) and gate(s). A suitable microcontroller is the Micrologix 1100 available from Allen Bradley. The microcontroller can be configured to convert the received control signals into another format, such as a format suitable for PLC control. Such converted control signals can then be sent to the valve assembly 18.

Figure 13B:
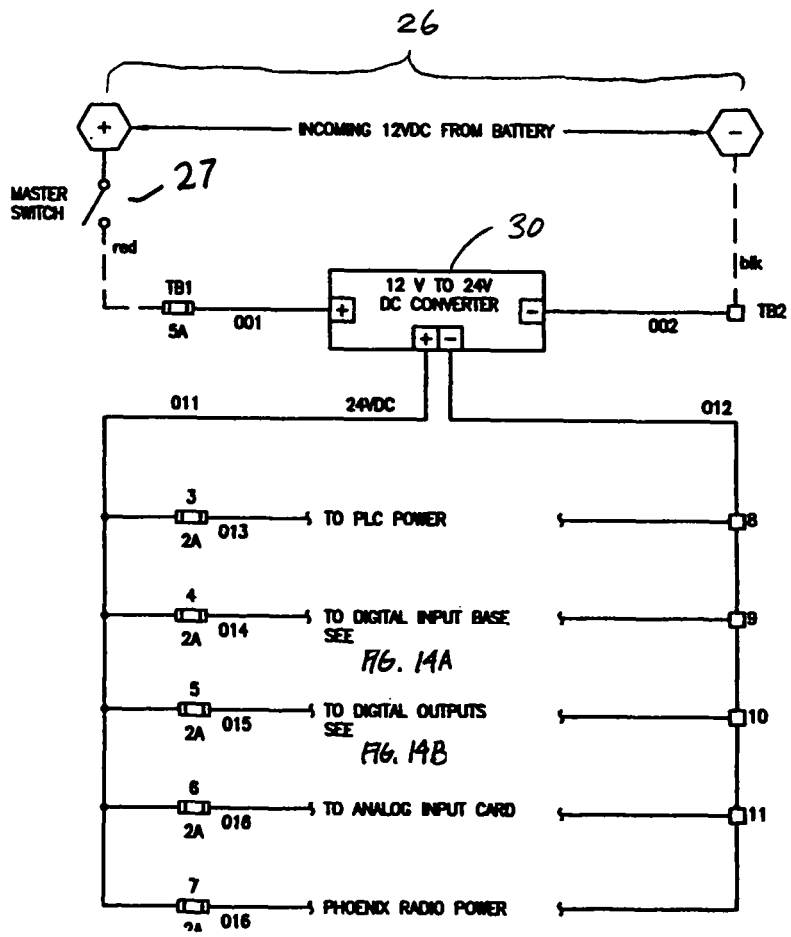
FIG. 13B is a schematic of an electrical circuit showing the electrical power distribution for operating the remote gate control unit.

The DC-to-DC converter 46 can be used to supply the correct DC voltage to various components. For example, if the source of power is a 12V source, the DC-to-DC converter 46 can convert the 12V input voltage to a 24V voltage suitable for the radio frequency transmitter 42 and PLC control of the valve assembly 18, as shown in FIG. 13B. A suitable DC-to-DC converter is the Model EQ 12/24V-2 available from Solar Converters, Inc.

The digital output card 48 allows digital outputs from the microcontroller 28 to be sent to other components. A suitable digital output card is the Model RAMOUT8DREL available from Phoenix.

Figure 14D:
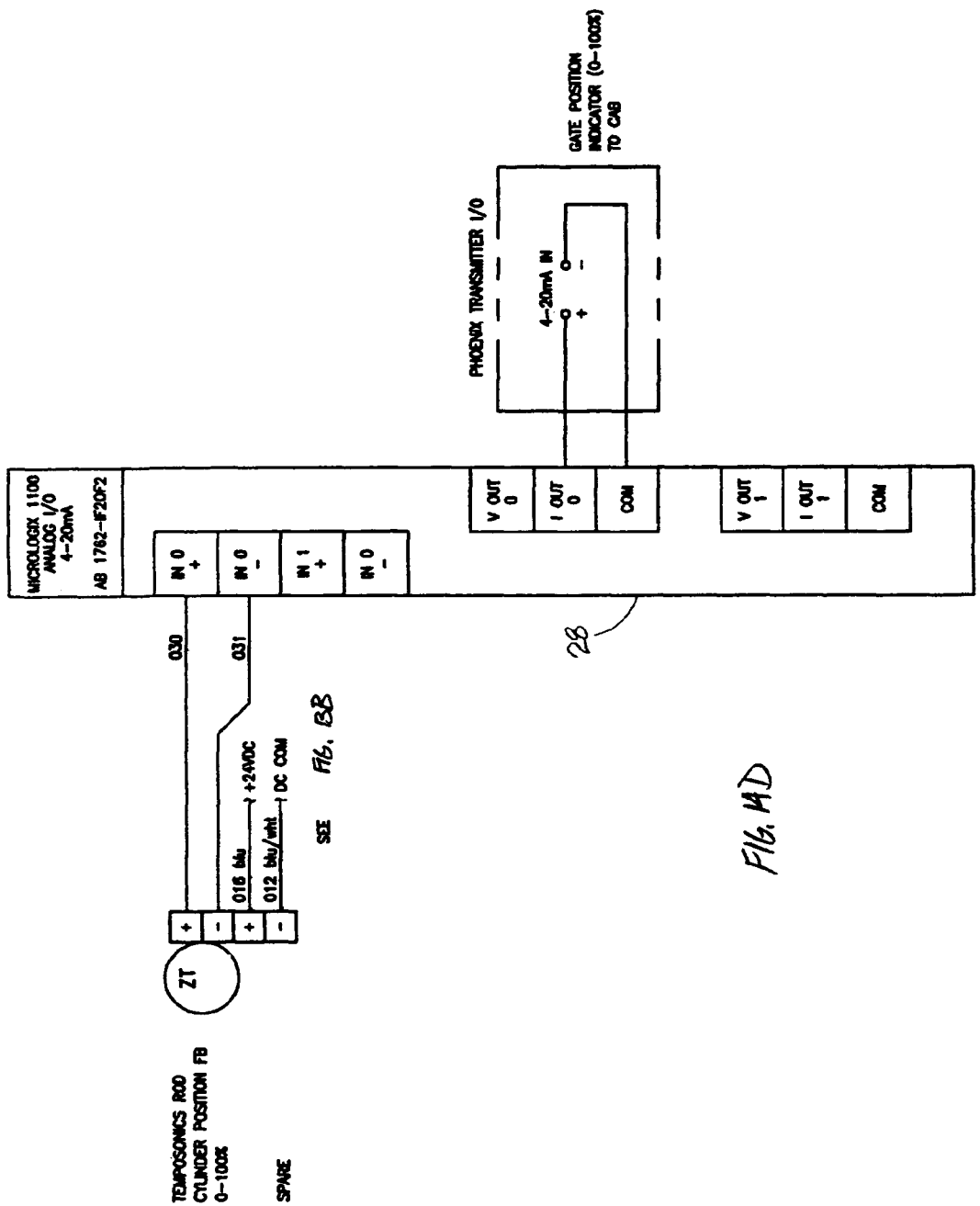
FIG. 14D is a wiring diagram showing the inputs to the remote gate control module from the actuator position sensor and the outputs to the driver-accessible control module.

FIGS. 14A, 14B and 14D show the logical layout and operation of the microcontroller 28 and its interaction with other components. FIG. 14A shows digital inputs to the microcontroller 28 from the driver-accessible control module 12 in the form of gate control instructions (FULL CLOSE, 18", 20", 24", 28" and FULL OPEN gate positions) for one gate, with the provision for control of one or more additional gates. Of course, infinite control of the gate among fully closed, intermediate and fully open positions can also be provided. FIG. 14B shows digital outputs from the microcontroller 28 in the form of instructions sent to the valve assembly 18, e.g., to open (extend), to close (retract) or to stop (hold). FIG. 14D shows the analog logic for inputs to the microcontroller 28 from the position sensor 22, and for outputs of this position information to the driver access control module 12.

Figure 15B:
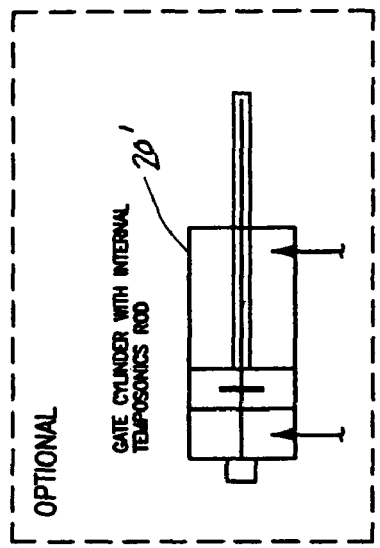
FIG. 15B is a diagram showing an optional actuator having an integrated position sensor.
Figure 15A:
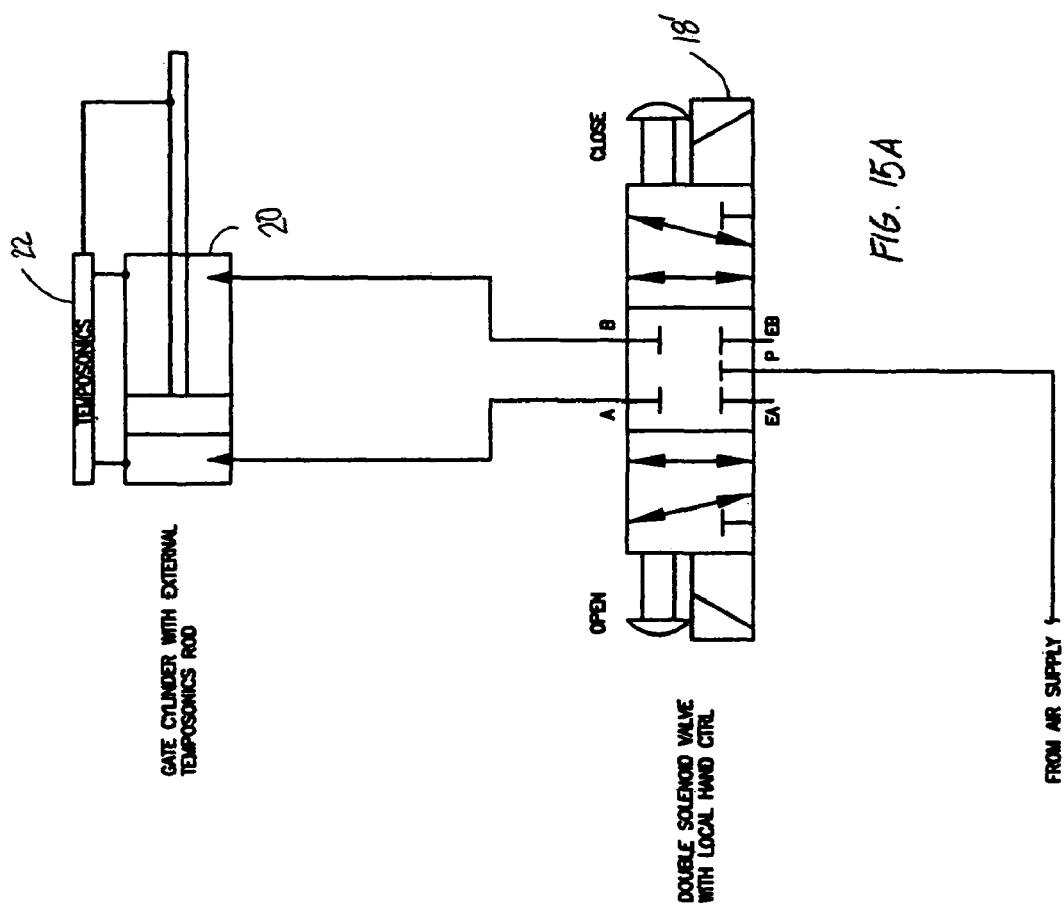
FIG. 15A is a schematic showing the valve assembly and the connections between the electrical control circuit and the pneumatic circuit.

FIG. 15A is a view of a valve assembly 18' and its connections to the actuator 20 and the position sensor 22. The valve assembly 18' may be a ROSS CONTROLS brand Infinite Gate Control Valve, which is a 5/3 double solenoid piloted valve, or other suitable valve. The valve assembly 18 or 18' can include a local hand control allowing for manual control of the actuator 20.

The valve assembly 18, as shown, e.g., in FIGS. 5 and 6, is a custom spool valve that may offer some advantages over the valve assembly 18' while accomplishing the same general objectives of controllably moving the actuator. The valve assembly 18 can be configured with larger ports than conventional valves, which allows for faster actuation times. Second, the valve assembly 18 can be designed as shown to have regulated air supplied to each side of the valve's diaphragm (as opposed to simply line pressure), which makes it possible for the valve to have more positive stops as it moves between positions. In addition, check valves 90 and 92 can be provided to prevent the migration of pressurized air from one side of the diaphragm to the other.

The position sensor 22 may be a linear position sensor, such as the Model No. SLS190/350/L/66/10/P available from Penny+Giles, or other suitable sensing device. In some embodiments, the position sensor 22 is mounted to a support, such as an extensible support 23, that is adapted to the geometry of the particular gate configuration.

FIG. 15B is a view of an optional actuator 20' that includes a position sensor integrated with the piston rod.

Supervisory Control Module

The system can also include an optional master or supervisory control module. The supervisory control module can be used in conjunction with the driver-accessible control module, or, in some situations, as a replacement for the driver-accessible control module. The supervisory control module is used to control the gate or gates in the same manner as the driver-accessible control module 12, i.e., by a wireless link as described above or by a wired or other form of link.

The supervisory control module can be positioned anywhere within range of its link to the gate actuating mechanism. Thus, the supervisory control module can occupy a generally stationary position at a jobsite, or it may be in another vehicle. In some embodiments, the supervisory control module is fitted to a grader tasked with spreading the material distributed by one or more load carrying vehicles. In this scenario, the supervisory control module can be configured to control the gate or gates for multiple vehicles on the job site. The supervisory control module may be configured to take on a master control role when the load carrying vehicles are within its range, with control being returned to the individual drivers via their respective driver-accessible control modules 12 when their vehicles exit the supervisory control module's range. According to some embodiments, the driver follows the supervisor's instructions and tunes his vehicle's driver-accessible control module to a specified frequency to allow the supervisor to assume control of operating the gate or gates.

A representative supervisory control module 60 is shown in FIG. 3. The supervisory control module 60 is configured to have radio frequency wireless communications capability to send control signals to the gate actuating mechanism 16 to effect movement of the gate or gates under control to move to the open position, to the closed position or to one of several intermediate operating positions, similar to the driver-accessible control modules 12. Like the driver-accessible control module 12, the control module 60 can be configured for controlling one gate or multiple gates, and the multiple gates may be on multiple different vehicles.

Hydraulic Actuator

As described above, the apparatus for moving the gate may be an actuator or other device capable of moving heavy mechanical equipment. Pneumatic actuators are described above. In other embodiments, it is possible to use a hydraulic actuator in which hydraulic fluid is the working fluid.

Figure 16:
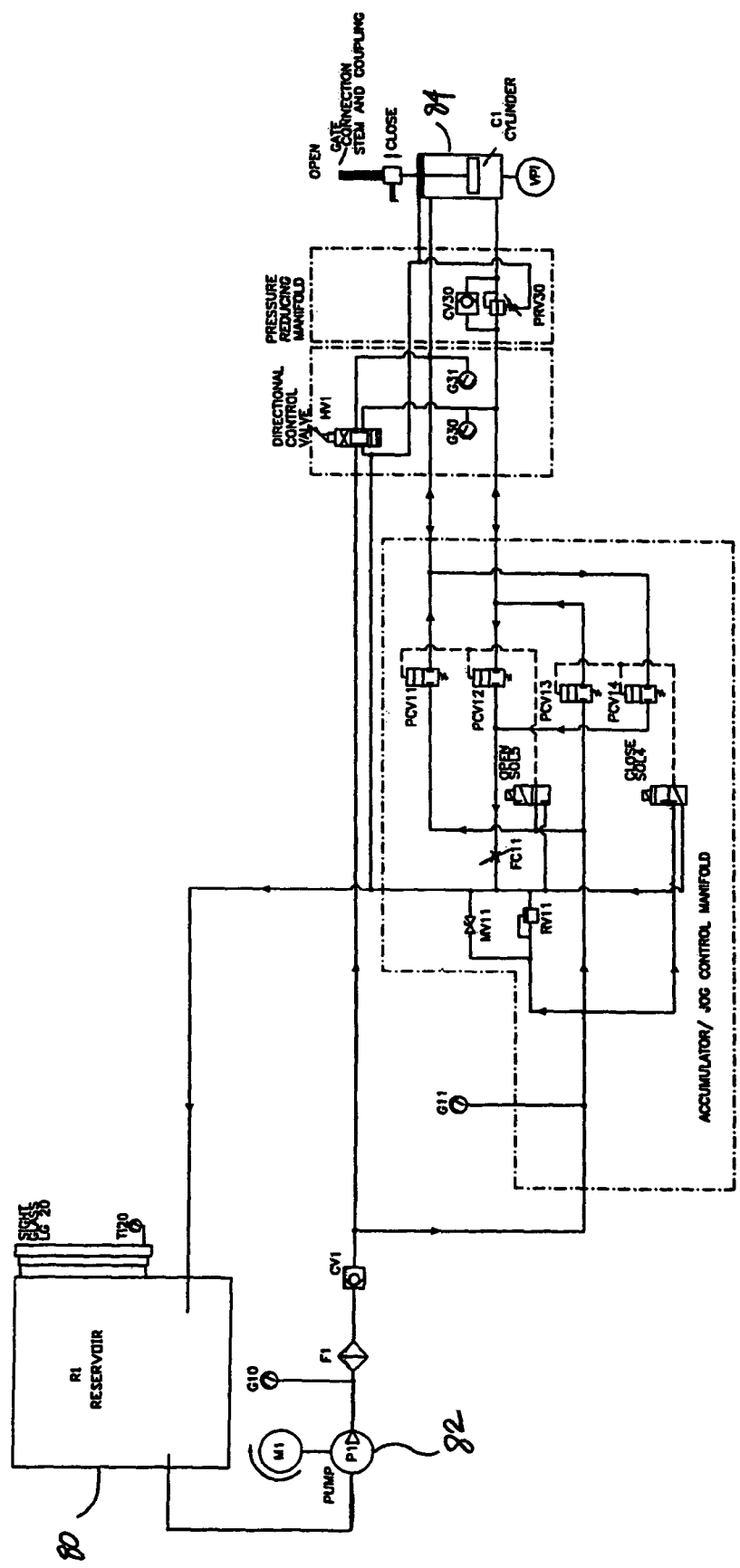
FIG. 16 is a schematic of a hydraulic gate actuating mechanism that uses hydraulic a hydraulic circuit.
Figure 17:
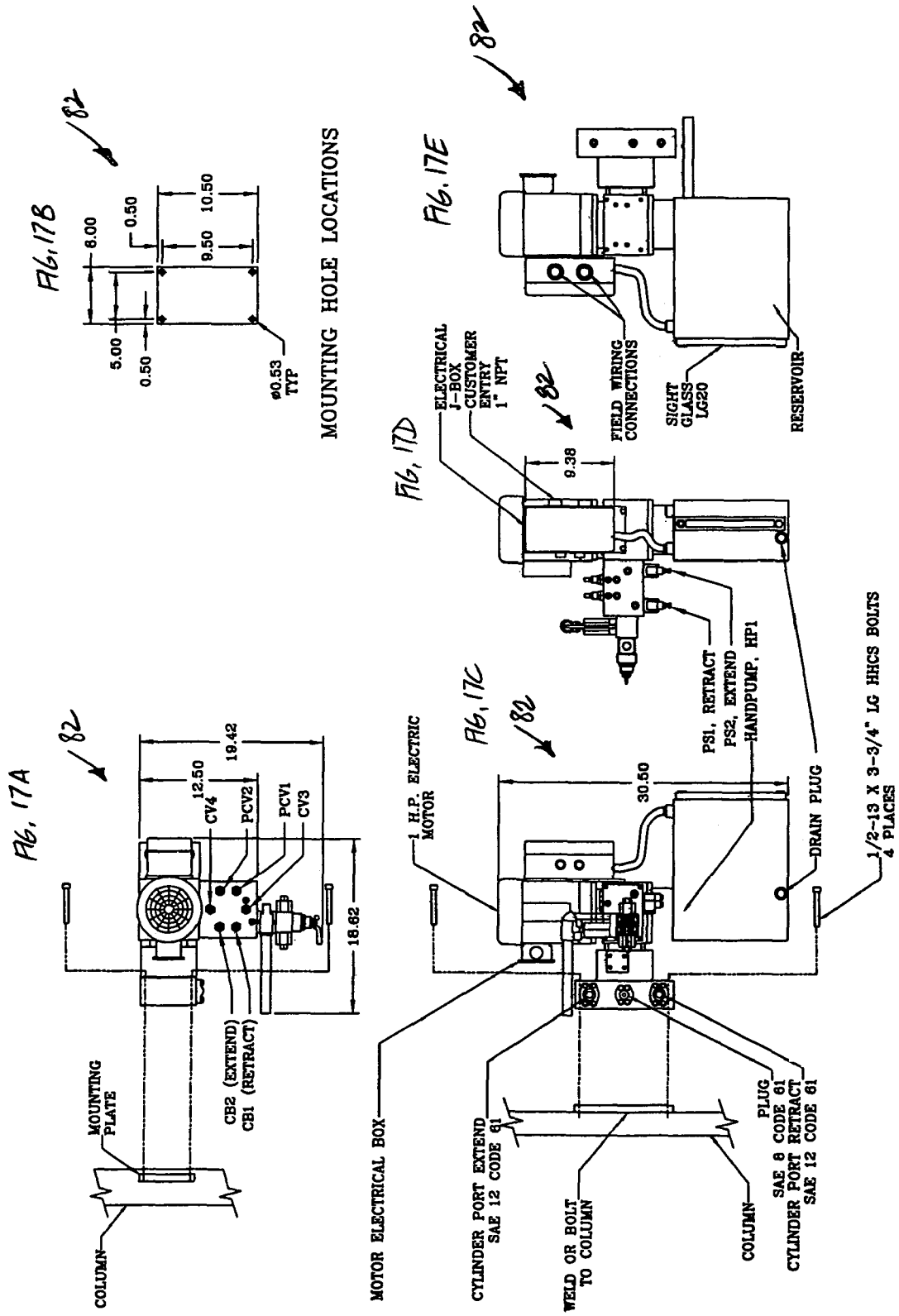
FIGS. 17A-17E are views of a hydraulic pump suitable for the hydraulic gate actuating mechanism.

Referring to FIG. 16, an embodiment of a suitable hydraulic system includes a reservoir 80 for storing hydraulic fluid, a pump 82 for pressurizing the fluid and valves and connections allowing the fluid under pressure to be selectively applied to move a hydraulic actuator 84 in the desired direction.

The pump 82 is provided if the vehicle (or its load carrying portion) is not provided with a source of hydraulic power. FIGS. 17A, 17B, 17C, 17D and 17E are additional views showing a suitable version of the pump 82. The pump 82 has a 1 HP electric motor that converts electrical energy into mechanical energy to compress the hydraulic fluid and power the hydraulic actuator 84.

Figure 18:
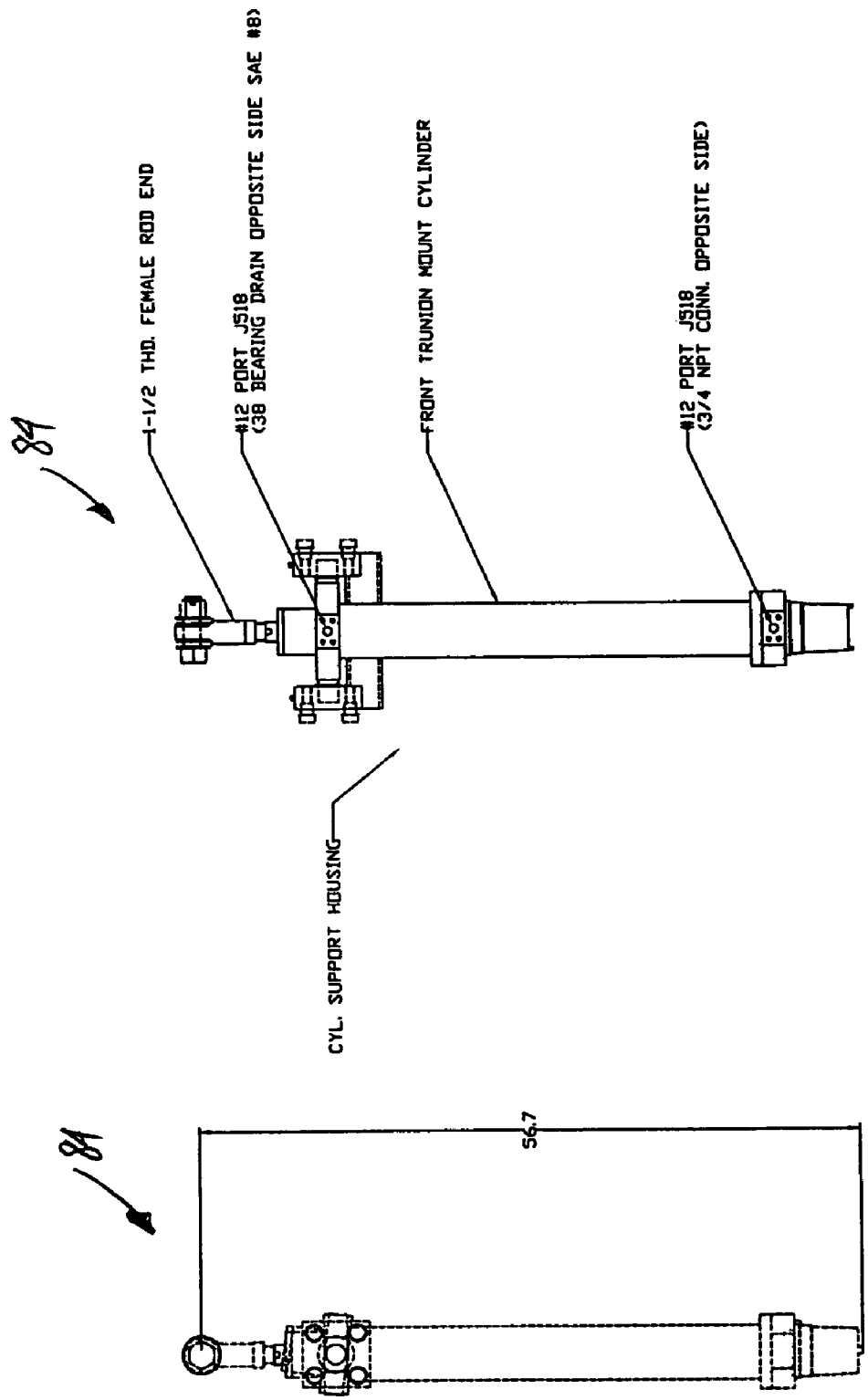
FIGS. 18A and 18B are views of a hydraulic actuator suitable for the hydraulic gate actuating mechanism.

FIGS. 18A and 18B are additional views showing a suitable version of the hydraulic actuator 84.

Other Aspects

In general, components of the system should be durable to withstand dirty and dusty conditions typical of a job site and vibration from travel along rough surfaces.

A memory element 94 can be provided for storing information relating to the system. For example, any of the control modules can include one or more memory elements 94, such as the driver control module 12 (see FIGS. 11B and 11C), the driver control module 12' (see FIGS. 12B and 12C), the remote gate control module 16 (see FIG. 10B) and/or the supervisory control module 60 (not shown). The memory element can be configured to store information such as number of trips (for the truck, for the trailer or both) and times, number of stops, duration of each trip, etc., which is useful for monitoring performance of drivers and vehicles, for billing and for scheduling routine service-based maintenance.

The system can include an alarm or other indicator to guide the driver (or supervisor) in certain situations. For example, where the vehicle includes a train (i.e., two or more) trailers, the system can provide a prompt to assist the driver in coordinating distribution of material from a first trailer and then transitioning to distribution to a second trailer. For example, drivers of two-trailer trains generally prefer to empty the second or trailing trailer first. To continue an even distribution as the second trailer becomes empty, the driver must initiate distribution from the first trailer within a fairly precise interval. Therefore, the system can be configured to provide the driver with information or an indicator (such as an alarm) to signal that the second trailer is almost empty. The driver then initiates distribution from the first trailer. Such information or indicator may be based on a sensed quantity (such as material volume in the second trailer) or on a predicted emptying time (based on, e.g., the travel distance and opening width). In other embodiments, it may be possible to provide for automatic transition between the distributing trailer in a multi-trailer train.

Implementation

Advantageously, the described system is fairly straightforward to retrofit for most conventional trailers. To retrofit the pneumatic system described above on a conventional trailer having an existing pneumatic circuit: (1) the driver-accessible control module 12 is installed and connected to the vehicle battery (or an equivalent power source); (2) the extensible support 23 and position sensor 22 are installed as shown in FIG. 7 with each opposite end of the extensible support 23 attached to one of the gate members 104a, 104b, such as by welding; (3) the valve assembly 18 is installed in place of a conventional pneumatic valve, and any necessary changes to the hosing and/or connections are made to connect the valve assembly to the existing pneumatic circuit and to the actuator 20; (4) the remote gate control module 16 is installed on the trailer, including its control connections to the valve system 18 and the position sensor 22 and its connection to a source of power; (5) the existing master switch is reconfigured as the master switch 27 by connecting it to the remote gate control module 16 instead of to the conventional valve; and (6) optionally, the chains are removed. If the conventional trailer does not have an actuator capable of maintaining a hold position, than the actuator 20 can be substituted. If a hydraulic system is desired, then the components of the hydraulic system as discussed in connection with FIG. 16 must also be provided. Of course, it is also possible to implement the system on new vehicles instead of retrofitting conventional vehicles.

According to one usual mode of operation, the system is used as follows. During loading and/or transit to the job site where the material in the load carrying portion of the vehicle is to be distributed, the gate or gates are maintained in a closed position, which can be with the power to the system off or on, depending upon the desired configuration. Upon arrival to the job site, before traveling over the desired distribution area, the driver selects an amount by which to open the gate. If a supervisor is present, the supervisor may instruct the driver to surrender control of the gate actuating mechanism for his vehicle while the supervisor optimizes the distribution. Once the desired initial opening size is set, the driver proceeds to drive the vehicle over the desired distribution area to distribute all or a quantity of his load. If necessary, adjustments to the distribution rate can be made by incrementally opening or closing the gate. Preferably, the driver drives the vehicle at a slow and constant rate during the distribution process. As the driver reaches the end of the distribution area, a command to close the gates is issued, either by the driver of the supervisor. With the gate or gates closed, the driver can continue to another distribution site or to obtain another load. When only a small amount of material remains in the load carrying portion, the gate or gates can be toggled between the fully closed and fully open positions to completely empty it.

Figure 9:
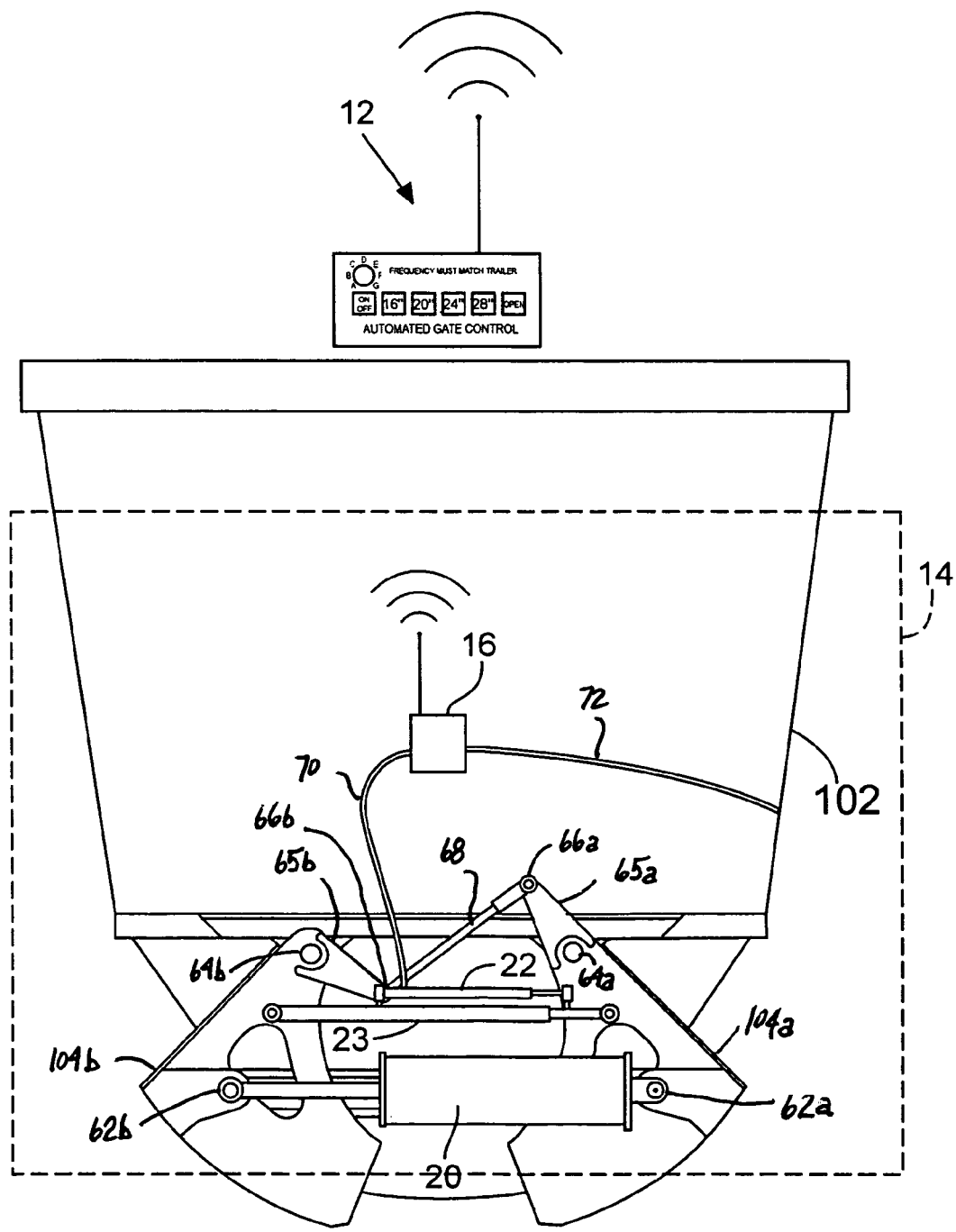
FIG. 9 is a view of the system similar to FIG. 7, except showing the gate in an operating position open to a desired width.

Specific details of some embodiments of the structure and operation of the system are shown, e.g., in FIGS. 7 and 9. In FIG. 7, the system 10 is shown after the driver accessible control system 12 has controlled the gate to move to its fully closed position as shown. The control signal from the driver accessible control module 12, which may result from the driver's (or supervisor's) input of the FULL CLOSE command or, in some implementations, by turning off the master switch 26, is sent wirelessly and is received by the remote gate control module 16 of the gate actuating mechanism 14. The remote gate control module 16 processes the control signals, and issues control signals via a connection 72 to the valve assembly 18 (not shown in FIG. 7), which can be in a form suitable for PLC control. In response to the control signals, the valve assembly 18 opens and/or closes valves to cause the actuator 20 (and the actuator 20', if present) to retract.

As shown in FIG. 7, the actuator 20 is attached to the gate members 104a, 104b at respective pivots 62a, 62b. The gate members 104a, 104b are pivotably attached to the load carrying portion 102 at respective pivots 64a, 64b. At their upper ends, the gate members 104a, 104b have respective ears 65a; 65b as shown with respective pivot connections 66a, 66b. A link arm 68 has one end pivotably attached to the pivot connection 66a and an opposite end connected to the pivot connection 66b. The link arm 68 helps the upper ends of the gate members 104a, 104b move in unison as their lower ends are pivoted away from or towards each other.

In the closed position, the gate members 104a, 104b are positioned such that their lateral edges are adjacent or overlapped, thus closing off the opening 103 and preventing any material in the load carrying portion 102 from being delivered through the opening 103. As the actuator 20 retracts and the gate members 104a, 104b are pivoted towards each other, the extensible support 23 retracts, which causes the position sensor 22 coupled to the extensible support 23 to retract. As the position sensor 22 retracts, it feeds back a signal via a connection 70 to the remote gate control module 16. The position sensor signal is communicated wirelessly to the driver-accessible control module 12, such as for display of the current gate position on the gate position indicator 52.

Referring to FIG. 9, the system 10 is shown with the gate open to a desired opening size or desired width. For example, the width of the opening shown in FIG. 9 may be 20 inches. The following description assumes that the system 10 was configured in the fully closed position as shown in FIG. 7 as a starting point. Thereafter, a command to move the gate from the fully closed position to the 20" opening position is issued, either by the driver depressing the 20" button on the driver accessible control module 12, or by a supervisor depressing a 20" button on the supervisory control module 60 (FIG. 3). The command is transmitted wirelessly to the remote gate control unit 16, which processes the command and issues appropriate control signals via the connection 72 to the valve assembly 18. The valve assembly responds and causes pressurized working fluid to flow and extend the actuator 20. As the actuator extends, the gate members 104a, 104b pivot with respect to the actuator 20 about the pivots 62a, 62b, respectively, and pivot away from each other about the pivots 64a, 64b. As the gate members 104a, 104b pivot away from each other, the extensible support 23 and the position sensor 22 extend. As the position sensor extends, it feeds back a signal via a connection 70 to the remote gate control module 16. The position sensor signal is communicated wirelessly to the driver-accessible control module 12, such as for display of the current gate position on the gate position indicator 52.

The position of the gate members 104a, 104b as sensed by the position sensor can also be used in feedback control of the actuator. Thus, as the sensed position of the gate members 104a, 104b approaches the desired 20" width opening, the current position information from the position sensor can be used to slow the extension of the actuator 20, and eventually to stop the actuator 20 when the opening is 20" wide. Thus, the driver (or supervisor) can issue a command to change the position of the gate, even while the vehicle is in motion, and without exiting the vehicle, and monitor the position of the gate until it reaches the desired position.

The described approach may provide for greater production for the construction crews that make use of it. In addition, it may also increase the productivity of the trucks and trailers. One advantage of the described approach systems is that it also saves time on every trip the truck and trailer make. In fact, the duration of each trip may be cut by 5-10 minutes. It takes some drivers longer than others, but the fact remains that installing and removing chains from a conventional trailer is required to empty the trailer completely, and is usually done each trip. The average hourly cost for a single truck/trailer combination is $65-$85/hr. Thus, not requiring the installation and removal of chains can translate into a savings of $5.50 to as much as $14.00 per load hauled. In some cases, a trailer will be used to haul 15 or more loads a day, and thus a savings of as much $200.00 a day per working trailer can be realized.

In view of the many possible embodiments to which the disclosed principles may be applied, it should be recognized that the illustrated embodiments are only preferred examples and should not be taken as limiting in scope. Rather, the scope is defined by the following claims. We therefore claim all that comes within the scope and spirit of these claims.

We claim:

1. A gate control system for use on a load carrying vehicle having a material distribution gate, comprising:
 a control module comprising controls positioned within reach of a driver of the vehicle and actuatable by the driver to select from a plurality of predetermined gate positions;
 a cylinder having a piston and actuation rod connected to the gate and operable to move the gate between open and closed positions and to hold the gate in a selected one of said plurality of predetermined gate positions;
 a valve assembly controllably linked to said control module and connected to said cylinder, said valve assembly including a spool that has a first position whereby a working fluid is supplied to the cylinder such that the working fluid urges the gate toward the open position, a second position whereby the working fluid is supplied to said cylinder such that the working fluid urges the gate toward the closed position, and a third position whereby the working fluid is supplied to said cylinder such that the working fluid simultaneously urges the gate toward the open and closed positions thereby holding the gate in the selected one of said plurality of predetermined gate positions, wherein said valve assembly includes check valves operative to contain the working fluid supplied to each side of said piston within said cylinder when said spool is in the third position;
 a pair of pressure regulators each operative to supply independently regulated working fluid to a respective side of said piston when said spool is in the third position; and
 a position sensor capable of generating a signal indicative of a position of the gate, whereby said control module controls the positioning of the spool using feedback from the position sensor such that the spool moves to the third position when the gate is in the selected one of said plurality of predetermined gate positions.

2. The gate control system of claim 1, wherein the cylinder is operable while the vehicle is in motion.

3. The gate control system of claim 1, wherein the valve assembly comprises a wireless link to the control module.

4. The gate control system of claim 1, wherein the valve assembly comprises a wired link to the control module.

5. The gate control system of claim 1, wherein the driver-accessible control module is mounted to a dashboard of the vehicle.

6. The gate control system of claim 1, wherein the driver-accessible control module comprises a display, a power connection to a source of electrical power for the control module and a control circuit comprising at least a transmitter that communicates to the gate actuating mechanism.

7. The gate control system of claim 6, wherein the control module comprises a memory capable of storing information.

8. The gate control system of claim 7, wherein the control module comprises a receiver capable of receiving signals.

9. The gate control system of claim 6, wherein the display is capable of displaying information indicating the position of the gate.

10. The gate control system of claim 1, wherein the vehicle is a motor vehicle.

11. The gate control system of claim 1, wherein the vehicle is a tractor connected to a separate trailer, and wherein the driver occupies a driver's seat in the tractor when the vehicle is being driven and the trailer comprises the load carrying portion.

\* \* \* \* \*

UNITED STATES PATENT AND TRADEMARK OFFICE
CERTIFICATE OF CORRECTION

| | | |
|---|---|---|
| PATENT NO. | : 7,980,636 B2 | Page 1 of 1 |
| APPLICATION NO. | : 11/655736 | |
| DATED | : July 19, 2011 | |
| INVENTOR(S) | : Douglas C. Miller et al. | |

It is certified that error appears in the above-identified patent and that said Letters Patent is hereby corrected as shown below:

On the Bibliography Page, (56), References Cited section, "0,234,622 A1" should read --2005/0234622 A1--.

In the Background, column 2, line 3, "in the in the" should read --in the--.

In the Brief Description of the Drawings, column 4, line 42, "uses hydraulic a hydraulic circuit" should read --uses a hydraulic circuit--.

In the Detailed Description, column 7, line 30, "FIG. 1 OA" should read --FIG. 10A--.

Signed and Sealed this
Fifteenth Day of November, 2011

David J. Kappos
*Director of the United States Patent and Trademark Office*